United States Patent
Chang et al.

(10) Patent No.: US 10,796,339 B2
(45) Date of Patent: Oct. 6, 2020

(54) DETECTING EXPIRED CONTENT WITHIN SLOTS IN A USER INTERFACE

(71) Applicant: Amazon Technologies, Inc., Seattle, WA (US)

(72) Inventors: Brandon Ross Ikaika Chang, Lake Forest Park, WA (US); Adam Lloyd Days, Tacoma, WA (US); Henry Robert Nickerson, Seattle, WA (US); Steven Howard Tarcza, II, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 52 days.

(21) Appl. No.: 16/117,618

(22) Filed: Aug. 30, 2018

(65) Prior Publication Data
US 2019/0012703 A1  Jan. 10, 2019

Related U.S. Application Data

(63) Continuation of application No. 14/864,313, filed on Sep. 24, 2015, now Pat. No. 10,089,654.

(51) Int. Cl.
*G06Q 30/02* (2012.01)
*H04L 29/08* (2006.01)
(Continued)

(52) U.S. Cl.
CPC ....... *G06Q 30/0264* (2013.01); *G06F 3/0483* (2013.01); *G06F 3/04817* (2013.01);
(Continued)

(58) Field of Classification Search
CPC ...................................................... G06Q 30/02
See application file for complete search history.

(56) References Cited

U.S. PATENT DOCUMENTS

| 5,970,469 A | 10/1999 | Scroggie et al. |
| 6,134,532 A | 10/2000 | Lazarus et al. |
(Continued)

FOREIGN PATENT DOCUMENTS

| CA | 2596307 | 8/2006 |
| JP | 11296587 | 10/1999 |
(Continued)

OTHER PUBLICATIONS

U.S. Appl. No. 12/608,688, filed Oct. 29, 2009, Office Action dated Dec. 14, 2012.
(Continued)

*Primary Examiner* — Vincent M Cao
(74) *Attorney, Agent, or Firm* — Thomas Horstemeyer, LLP

(57) ABSTRACT

Disclosed are various embodiments for generating a content page with markup language corresponding to user interface widgets. A user interface widget can generate markup language to be incorporated into the content page. The markup language can be analyzed to determine whether it contains a content identifier. The content identifier can be embedded within a portion of a URL. An analysis of the content identifier can be performed to determine whether the content identifier corresponds to expired content.

20 Claims, 8 Drawing Sheets

(51) Int. Cl.
*G06F 16/958* (2019.01)
*G06F 21/64* (2013.01)
*G06F 40/14* (2020.01)
*G06F 40/186* (2020.01)
*G06F 3/0481* (2013.01)
*G06F 3/0483* (2013.01)

(52) U.S. Cl.
CPC ............ *G06F 16/958* (2019.01); *G06F 21/64* (2013.01); *G06F 40/14* (2020.01); *G06F 40/186* (2020.01); *H04L 67/02* (2013.01)

(56) References Cited

U.S. PATENT DOCUMENTS

| | | |
|---|---|---|
| 6,292,786 B1 | 9/2001 | Deaton et al. |
| 6,332,128 B1 | 12/2001 | Nicholson |
| 6,336,098 B1 | 1/2002 | Fortenberry et al. |
| 6,571,216 B1 | 5/2003 | Garg et al. |
| 6,925,441 B1 | 8/2005 | Jones, III et al. |
| 6,980,962 B1 | 12/2005 | Arganbright et al. |
| 7,013,286 B1 | 3/2006 | Aggarwal et al. |
| 7,124,092 B2 | 10/2006 | O'Toole, Jr. et al. |
| 7,225,142 B1 | 5/2007 | Apte et al. |
| 2001/0014868 A1 | 8/2001 | Herz et al. |
| 2001/0021914 A1 | 9/2001 | Jacobi et al. |
| 2001/0049661 A1 | 12/2001 | Power et al. |
| 2002/0010627 A1 | 1/2002 | Lerat |
| 2002/0036654 A1* | 3/2002 | Evans .................. G06Q 30/02 715/744 |
| 2002/0046099 A1* | 4/2002 | Frengut .............. G06Q 30/0225 705/14.52 |
| 2002/0049657 A1 | 4/2002 | Main et al. |
| 2002/0053076 A1 | 5/2002 | Landesmann |
| 2002/0138346 A1 | 9/2002 | Kodaka et al. |
| 2002/0138348 A1 | 9/2002 | Narayan et al. |
| 2002/0161634 A1* | 10/2002 | Kaars ................. H04N 5/44591 705/14.55 |
| 2002/0169673 A1 | 11/2002 | Prorock et al. |
| 2002/0178051 A1 | 11/2002 | Golden et al. |
| 2002/0194067 A1 | 12/2002 | Wechsler et al. |
| 2002/0198785 A1 | 12/2002 | Chae |
| 2003/0130883 A1 | 7/2003 | Schroeder et al. |
| 2003/0135414 A1 | 7/2003 | Tai |
| 2003/0233276 A1 | 12/2003 | Pearlman et al. |
| 2003/0233320 A1 | 12/2003 | Connor |
| 2004/0010627 A1 | 1/2004 | Ellis et al. |
| 2004/0054575 A1 | 3/2004 | Marshall |
| 2004/0054589 A1 | 3/2004 | Nicholas et al. |
| 2004/0083170 A1 | 4/2004 | Bam et al. |
| 2004/0098305 A1 | 5/2004 | Truong et al. |
| 2004/0168083 A1 | 8/2004 | Gasparini et al. |
| 2004/0249712 A1 | 12/2004 | Brown et al. |
| 2004/0267611 A1 | 12/2004 | Hoerenz |
| 2005/0071228 A1 | 3/2005 | Bortolin et al. |
| 2005/0131761 A1 | 6/2005 | Trika et al. |
| 2005/0160003 A1 | 7/2005 | Berardi et al. |
| 2005/0242177 A1 | 11/2005 | Roberge et al. |
| 2006/0069616 A1 | 3/2006 | Bau |
| 2006/0080297 A1 | 4/2006 | Barth |
| 2006/0173830 A1 | 8/2006 | Smyth et al. |
| 2006/0190330 A1 | 8/2006 | Tollinger et al. |
| 2006/0235764 A1 | 10/2006 | Bamborough et al. |
| 2006/0287913 A1 | 12/2006 | Baluja |
| 2006/0293959 A1 | 12/2006 | Hogan |
| 2007/0100688 A1 | 5/2007 | Book |
| 2007/0130090 A1 | 6/2007 | Staib et al. |
| 2007/0156528 A1 | 7/2007 | Hopp et al. |
| 2007/0162337 A1 | 7/2007 | Hawkins |
| 2007/0198339 A1 | 8/2007 | Shen et al. |
| 2007/0208729 A1 | 9/2007 | Martino |
| 2007/0244745 A1 | 10/2007 | Boal |
| 2008/0052169 A1 | 2/2008 | O'Shea et al. |
| 2008/0059208 A1 | 3/2008 | Rockfeller et al. |
| 2008/0065490 A1 | 3/2008 | Novick et al. |
| 2008/0097830 A1* | 4/2008 | Kim .................... G06Q 30/02 705/14.4 |
| 2008/0097906 A1* | 4/2008 | Williams ............. G06Q 20/40 705/44 |
| 2008/0154707 A1 | 6/2008 | Mittal et al. |
| 2008/0154727 A1 | 6/2008 | Carlson |
| 2008/0195460 A1 | 8/2008 | Varghese |
| 2008/0195483 A1* | 8/2008 | Moore .................. G06Q 10/10 705/14.69 |
| 2008/0262914 A1* | 10/2008 | Suveyke ............ G06Q 30/0256 705/14.54 |
| 2008/0262928 A1 | 10/2008 | Michaelis |
| 2008/0270231 A1 | 10/2008 | Li et al. |
| 2008/0313011 A1 | 12/2008 | Rose et al. |
| 2008/0319846 A1 | 12/2008 | Leming et al. |
| 2009/0000212 A1 | 1/2009 | Kennedy |
| 2009/0028054 A1 | 1/2009 | Kumar et al. |
| 2009/0106115 A1 | 4/2009 | James et al. |
| 2009/0144164 A1 | 6/2009 | Wane et al. |
| 2009/0171766 A1 | 7/2009 | Schiff et al. |
| 2009/0172551 A1* | 7/2009 | Kane .................... G06Q 30/02 715/733 |
| 2009/0192869 A1 | 7/2009 | Irvine |
| 2009/0198563 A1 | 8/2009 | Tung et al. |
| 2009/0204485 A1 | 8/2009 | Wills et al. |
| 2009/0234745 A1 | 9/2009 | Ramer et al. |
| 2009/0254931 A1 | 10/2009 | Pizzurro et al. |
| 2009/0271264 A1 | 10/2009 | Regmi et al. |
| 2009/0288012 A1 | 11/2009 | Herte et al. |
| 2009/0307143 A1 | 12/2009 | Reistad et al. |
| 2010/0218128 A1* | 8/2010 | Bonat ................ G06Q 30/0211 715/765 |
| 2010/0257058 A1* | 10/2010 | Karidi .................. G06Q 30/02 705/14.55 |
| 2012/0109736 A1 | 5/2012 | Laor |
| 2012/0136706 A1 | 5/2012 | Chang et al. |
| 2012/0136707 A1 | 5/2012 | Chang et al. |
| 2012/0136708 A1 | 5/2012 | Chang et al. |
| 2012/0136710 A1 | 5/2012 | Chang et al. |
| 2012/0136712 A1 | 5/2012 | Chang et al. |

FOREIGN PATENT DOCUMENTS

| | | |
|---|---|---|
| JP | 2001319124 | 11/2001 |
| JP | 2001357279 | 12/2001 |
| JP | 2002083201 | 3/2002 |
| JP | 2002157266 | 5/2002 |
| JP | 2002279274 | 9/2002 |
| JP | 2003503762 | 1/2003 |
| JP | 2003076911 | 3/2003 |
| JP | 2003533763 | 11/2003 |
| JP | 2003536172 | 12/2003 |
| JP | 2004094406 | 3/2004 |
| JP | 2006133931 | 5/2004 |
| JP | 2005037563 | 2/2005 |
| JP | 2005503602 | 2/2005 |
| JP | 2005149187 | 6/2005 |
| JP | 2006023864 | 1/2006 |
| JP | 2006155317 | 6/2006 |
| JP | 2006277270 | 10/2006 |
| JP | 2006338638 | 12/2006 |
| JP | 2007509394 | 4/2007 |
| JP | 2007516537 | 6/2007 |
| JP | 2008052383 | 3/2008 |
| JP | 2008077521 | 4/2008 |
| JP | 2008107898 | 5/2008 |
| JP | 2009169766 | 7/2009 |
| JP | 2010218483 | 9/2010 |
| KR | 20060005153 | 1/2006 |
| KR | 20090000212 | 1/2009 |
| KR | 20090000643 | 1/2009 |
| WO | 200152155 | 7/2001 |

(56) References Cited

FOREIGN PATENT DOCUMENTS

| | | |
|---|---|---|
| WO | 2007059295 | 5/2007 |
| WO | 2009070475 | 6/2009 |

OTHER PUBLICATIONS

U.S. Appl. No. 12/956,608, filed Nov. 30, 2010, Final Office Action dated Jun. 1, 2015.
U.S. Appl. No. 12/956,608, filed Nov. 30, 2010, Final Office Action dated Sep. 20, 2013.
U.S. Appl. No. 12/956,608, filed Nov. 30, 2010, Non-Final Office Action dated Jan. 5, 2016.
U.S. Appl. No. 12/956,608, filed Nov. 30, 2010, Non-Final Office Action dated Jan. 29, 2013.
U.S. Appl. No. 12/956,608, filed Nov. 30, 2010, Non-Final Office Action dated Jul. 30, 2015.
U.S. Appl. No. 12/956,608, filed Nov. 30, 2010, Non-Final Office Action dated Aug. 28, 2014.
U.S. Appl. No. 12/956,608, filed Nov. 30, 2010, Response to Final Office Action dated Jun. 1, 2015.
U.S. Appl. No. 12/956,608, filed Nov. 30, 2010, Response to Final Office Action dated Sep. 20, 2013.
U.S. Appl. No. 12/956,608, filed Nov. 30, 2010, Response to Non-Final Office Action dated Jan. 29, 2013.
U.S. Appl. No. 12/956,608, filed Nov. 30, 2010, Response to Non-Final Office Action mailed on Aug. 28, 2014.
U.S. Appl. No. 12/956,638, filed Nov. 30, 2010, Advisory Action dated Aug. 5, 2015.
U.S. Appl. No. 12/956,638, filed Nov. 30, 2010, Final Office Action dated May 19, 2015.
U.S. Appl. No. 12/956,638, filed Nov. 30, 2010, Final Office Action dated Sep. 26, 2013.
U.S. Appl. No. 12/956,638, filed Nov. 30, 2010, Non-Final Office Action dated Jan. 29, 2016.
U.S. Appl. No. 12/956,638, filed Nov. 30, 2010, Non-Final Office Action dated Feb. 5, 2013.
U.S. Appl. No. 12/956,638, filed Nov. 30, 2010, Non-Final Office Action dated Aug. 28, 2014.
U.S. Appl. No. 12/956,638, filed Nov. 30, 2010, Response of Non-Final Office Action dated Feb. 5, 2013.
U.S. Appl. No. 12/956,638, filed Nov. 30, 2010, Response to Final Office Action dated May 19, 2015.
U.S. Appl. No. 12/956,638, filed Nov. 30, 2010, Response to Final Office Action dated Sep. 26, 2013.
U.S. Appl. No. 12/956,638, filed Nov. 30, 2010, Response to Non-Final Office Action dated Aug. 28, 2014.
U.S. Appl. No. 12/956,653, filed Nov. 30, 2010, Final Office Action dated Sep. 26, 2013.
U.S. Appl. No. 12/956,653, filed Nov. 30, 2010, Non-Final Office Action dated Feb. 5, 2013.
U.S. Appl. No. 12/956,653, filed Nov. 30, 2010, Non-Final Office Action dated Sep. 5, 2014.
U.S. Appl. No. 12/956,653, filed Nov. 30, 2010, Response to Final Office Action dated Sep. 26, 2013.
U.S. Appl. No. 12/956,653, filed Nov. 30, 2010, Response to Non-Final Office Action dated Feb. 5, 2013.
U.S. Appl. No. 12/956,658, filed Nov. 30, 2010, Final Office Action dated Jun. 10, 2015.
U.S. Appl. No. 12/956,658, filed Nov. 30, 2010, Final Office Action dated Sep. 11, 2013.
U.S. Appl. No. 12/956,658, filed Nov. 30, 2010, Non-Final Office Action dated Feb. 15, 2013.
U.S. Appl. No. 12/956,658, filed Nov. 30, 2010, Non-Final Office Action dated Jun. 23, 2016.
U.S. Appl. No. 12/956,658, filed Nov. 30, 2010, Non-Final Office Action dated Sep. 9, 2014.
U.S. Appl. No. 12/956,658, filed Nov. 30, 2010, Non-Final Office Action dated Sep. 23, 2015.
U.S. Appl. No. 12/956,658, filed Nov. 30, 2010, Response to Final Office Action dated Jun. 10, 2015.
U.S. Appl. No. 12/956,658, filed Nov. 30, 2010, Response to Final Office Action dated Sep. 11, 2013.
U.S. Appl. No. 12/956,658, filed Nov. 30, 2010, Response to Non-Final Office Action dated Feb. 15, 2013.
U.S. Appl. No. 12/956,658, filed Nov. 30, 2010, Response to Non-Final Office Action dated Sep. 9, 2014.
U.S. Appl. No. 12/956,684, filed Nov. 30, 2010, Final Office Action dated Sep. 30, 2013.
U.S. Appl. No. 12/956,684, filed Nov. 30, 2010, Non-Final Office Action dated Feb. 1, 2013.
U.S. Appl. No. 12/956,684, filed Nov. 30, 2010, Non-Final Office Action dated Sep. 9, 2014.
U.S. Appl. No. 12/956,684, filed Nov. 30, 2010, Response to Final Office Action dated Sep. 30, 2013.
U.S. Appl. No. 12/956,684, filed Nov. 30, 2010, Response to Non-Final Office Action dated Feb. 1, 2013.
U.S. Appl. No. 13/589,382, filed Aug. 20, 2012, Final Office Action dated Nov. 9, 2015.
U.S. Appl. No. 13/589,382, filed Aug. 20, 2012, Final Office Action dated Nov. 16, 2016.
U.S. Appl. No. 13/589,382, filed Aug. 20, 2012, Non-Final Office Action dated Apr. 3, 2015.
U.S. Appl. No. 13/589,382, filed Aug. 20, 2012, Non-Final Office Action dated May 2, 2016.
U.S. Appl. No. 13/589,382, filed Aug. 20, 2012, Response to Final Office Action dated Nov. 9, 2015.
Japanese Patent Application 2013-536942 filed on Nov. 28, 2011, Office Action dated Dec. 2, 2014.
Japanese Patent Application 2013-536942 filed on Nov. 28, 2011, Notice of Allowance dated Jan. 6, 2015.
Indian Patent Application 3751/DELNP/2013 filed on Nov. 28, 2011, Office Action dated Feb. 25, 2019.
Canadian Patent Application 2,812,603 filed on Nov. 28, 2011, Office Action dated Oct. 16, 2014.
Canadian Patent Application 2,812,603 filed on Nov. 28, 2011, Office Action dated Dec. 4, 2015.
Canadian Patent Application 2,812,603 filed on Nov. 28, 2011, Office Action dated Nov. 15, 2016.
PCT Patent Application PCT/US2010/053732 filed on Oct. 22, 2010, International Search Report and Written Opinion dated Dec. 21, 2010.
European Patent Application EP10827351.7 filed on Oct. 22, 2010, Office Action dated Jul. 12, 2018.
European Patent Application EP10827351.7 filed on Oct. 22, 2010, Office Action dated Nov. 30, 2018.
Korean Patent Application 10-2012-7011701 filed on Oct. 22, 2010, Office Action dated Jul. 5, 2017.
Definition of Authenticate in English. Authenticate: Definition of Authenticate in Oxford Dictionary. Oxford Dictionaries, n.d. Web. Sep. 4, 2013.
U.S. Appl. No. 14/864,313 filed Sep. 24, 2015, Notice of Allowance dated Aug. 31, 2018.
U.S. Appl. No. 13/589,382 entitled "Advertisements Responsive to Coupon States" and filed on Aug. 20, 2012.
U.S. Appl. No. 13/534,418 entitled "Systems and Methods for Interactive Advertising" and filed on Jun. 27, 2012.
U.S. Appl. No. 13/276,821 entitled "Purchase Targeted Coupons" and filed on Oct. 19, 2011.
U.S. Appl. No. 12/956,608 entitled "Digital Coupon System" and filed on Nov. 30, 2010.
U.S. Appl. No. 12/956,638 entitled "Digital Coupon System" and filed on Nov. 30, 2010.
U.S. Appl. No. 12/956,653 entitled "Digital Coupon System" and filed Nov. 30, 2010.
U.S. Appl. No. 12/956,658 entitled "Digital Coupon System" and filed Nov. 30, 2010.
U.S. Appl. No. 12/956,684 entitled "Digital Coupon System" and filed Nov. 30, 2010.
U.S. Appl. No. 13/589,382, filed Aug. 20, 2012, Notice of Allowance dated Sep. 12, 2019.

(56) References Cited

OTHER PUBLICATIONS

U.S. Appl. No. 13/589,382, filed Aug. 20, 2012, Response to Non-Final Office Action dated May 2, 2016.
U.S. Appl. No. 13/589,382, filed Aug. 20, 2012, Response to Non-Final Office Action dated Apr. 3, 2015.
U.S. Appl. No. 12/608,679, filed Oct. 29, 2009, Examiner's Answer dated Mar. 13, 2011.
U.S. Appl. No. 12/608,679, filed Oct. 29, 2009, Examiner's Answer dated Dec. 21, 2017.
U.S. Appl. No. 12/608,679, filed Oct. 29, 2009, Final Office Action dated Mar. 29, 2017.
U.S. Appl. No. 12/608,679, filed Oct. 29, 2009, Office Action dated Jul. 18, 2012.
U.S. Appl. No. 12/608,679, filed Oct. 29, 2009, Office Action dated Sep. 22, 2016.
U.S. Appl. No. 12/608,679, filed Oct. 29, 2009, Office Action dated Dec. 20, 2011.
U.S. Appl. No. 12/608,679, filed Oct. 29, 2009, Patent Board of Appeals Decision dated Jun. 24, 2016.
U.S. Appl. No. 12/608,679, filed Oct. 29, 2009, Patent Board of Appeals Decision dated Nov. 8, 2012.
U.S. Appl. No. 12/608,673, filed Oct. 29, 2009, Advisory Action dated Mar. 23, 2016.
U.S. Appl. No. 12/608,673, filed Oct. 29, 2009, Advisory Action dated Apr. 17, 2015.
U.S. Appl. No. 12/608,673, filed Oct. 29, 2009, Advisory Action dated May 26, 2016.
U.S. Appl. No. 12/608,673, filed Oct. 29, 2009, Final Office Action dated Feb. 5, 2015.
U.S. Appl. No. 12/608,673, filed Oct. 29, 2009, Final Office Action dated Jun. 1, 2012.
U.S. Appl. No. 12/608,673, filed Oct. 29, 2009, Final Office Action dated Dec. 3, 2015.
U.S. Appl. No. 12/608,673, filed Oct. 29, 2009, Non-Final Office Action dated Jan. 29, 2014.
U.S. Appl. No. 12/608,673, filed Oct. 29, 2009, Non-Final Office Action dated Jun. 12, 2015.
U.S. Appl. No. 12/608,673, filed Oct. 29, 2009, Non-Final Office Action dated Jul. 16, 2014.
U.S. Appl. No. 12/608,673, filed Oct. 29, 2009, Non-Final Office Action dated Dec. 23, 2011.
U.S. Appl. No. 12/608,673, filed Oct. 29, 2009, Response to Final Office Action dated Feb. 5, 2015.
U.S. Appl. No. 12/608,673, filed Oct. 29, 2009, Response to Final Office Actiondated Jun. 1, 2012.
U.S. Appl. No. 12/608,673, filed Oct. 29, 2009, Response to Final Office Action dated Dec. 3, 2015.
U.S. Appl. No. 12/608,673, filed Oct. 29, 2009, Response to Non-Final Office Action dated Jan. 29, 2014.
U.S. Appl. No. 12/608,673, filed Oct. 29, 2009, Response to Non-Final Office Action dated Jun. 12, 2015.
U.S. Appl. No. 12/608,673, filed Oct. 29, 2009, Response to Non-Final Office Action dated Jul. 16, 2014.
U.S. Appl. No. 12/608,673, filed Oct. 29, 2009, Response to Non-Final Office Action dated Dec. 23, 2011.
U.S. Appl. No. 12/608,688, filed Oct. 29, 2009, Response to Office Action dated Jan. 6, 2012.
U.S. Appl. No. 12/608,688, filed Oct. 29, 2009, Response to Office Action dated Feb. 26, 2014.
U.S. Appl. No. 12/608,688, filed Oct. 29, 2009, Response to Office Action dated May 1, 2015.
U.S. Appl. No. 12/608,688, filed Oct. 29, 2009, Response to Office Action dated Jul. 20, 2012.
U.S. Appl. No. 12/608,688, filed Oct. 29, 2009, Response to Office Action dated Aug. 6, 2014.
U.S. Appl. No. 12/608,688, filed Oct. 29, 2009, Response to Office Action dated Dec. 14, 2012.
U.S. Appl. No. 12/608,688, filed Oct. 29, 2009, Advisory Action dated Jul. 14, 2015.
U.S. Appl. No. 12/608,688, filed Oct. 29, 2009, Office Action dated Jan. 6, 2012.
U.S. Appl. No. 12/608,688, filed Oct. 29, 2009, Office Action dated Feb. 26, 2014.
U.S. Appl. No. 12/608,688, filed Oct. 29, 2009, Office Action dated May 1, 2015.
U.S. Appl. No. 12/608,688, filed Oct. 29, 2009, Office Action dated Jul. 20, 2012.
U.S. Appl. No. 12/608,688, filed Oct. 29, 2009, Office Action dated Aug. 6, 2014.
U.S. Appl. No. 12/608,688, filed Oct. 29, 2009, Office Action dated Nov. 2, 2015.
European Patent Application EP10827351.7 filed on Oct. 22, 2010, Extended European Search Report dated Oct. 8, 2014.
European Patent Application EP10827351.7 filed on Oct. 22, 2010, Office Action dated Apr. 10, 2017.
Canadian Patent Application CA2,777,957 filed on Oct. 22, 2010, 1st Office Action dated May 24, 2016.
Canadian Patent Application CA2,777,957 filed on Oct. 22, 2010, 2nd Office Action dated Apr. 21, 2017.
Canadian Patent Application CA2,777,957 filed on Oct. 22, 2010, 3rd Office Action dated Mar. 23, 2018.
Canadian Patent Application CA2,777,957 filed on Oct. 22, 2010, Notice of Allowance dated Apr. 2, 2019.
Chinese Patent Application CN201080048743.6 filed on Oct. 22, 2010, 1st Office Action dated Jul. 7, 2014.
Chinese Patent Application CN201080048743.6 filed on Oct. 22, 2010, 2nd Office Action dated Mar. 25, 2015.
Chinese Patent Application CN201080048743.6 filed on Oct. 22, 2010, 3rd Office Action dated Sep. 25, 2015.
Chinese Patent Application CN201080048743.6 filed on Oct. 22, 2010, 4th Office Action dated Mar. 31, 2016.
Japanese Patent Application JP2012-536901 filed on Oct. 22, 2010, Determination of Allowance dated Jan. 15, 2015.
Japanese Patent Application JP2012-536901 filed on Oct. 22, 2010, Notice of Reasons Rejection dated Jan. 14, 2014.
Korea Patent Application KR10-2012-7011453 filed on Oct. 22, 2010, Office Action dated May 15, 2017.
Korea Patent Application KR10-2012-7011453 filed on Oct. 22, 2010, Notice of Allowance dated Nov. 23, 2017.
Indian Patent Application 3584/DELNP/2012 filed on Oct. 22, 2010, Examintion Report dated Jun. 20, 2018.
PCT Patent Application PCT/US2010/053735 filed on Oct. 22, 2010, International Search Report and Written Opinion dated Dec. 17, 2010.
European Patent Application 10827352.5 filed on Oct. 22, 2010, Search Report dated Oct. 19, 2014.
European Patent Application 10827352.5 filed on Oct. 22, 2010, Office Action dated Apr. 10, 2017.
European Patent Application 10827352.5 filed on Oct. 22, 2010, Office Action dated Jul. 10, 2018.
Canadian Patent Application 2,777,959 filed on Oct. 22, 2010, Office Action dated Jul. 15, 2016.
Canadian Patent Application 2,777,959 filed on Oct. 22, 2010, Office Action dated Jul. 5, 2017.
Canadian Patent Application 2,777,959 filed on Oct. 22, 2010, Office Action dated Jul. 18, 2018.
Canadian Patent Application 2,777,959 filed on Oct. 22, 2010, Notice of Allowance dated Jul. 26, 2019.
Chinese Patent Application 201080048736.6 filed on Oct. 22, 2010, First Office Action dated Mar. 2, 2015.
Chinese Patent Application 201080048736.6 filed on Oct. 22, 2010, Second Office Action dated Oct. 29, 2015.
Japanese Patent Application 2012-536902 filed on Oct. 22, 2010, Office Action dated Jan. 7, 2014.
Japanese Patent Application 2012-536902 filed on Oct. 22, 2010, Notice of Allowance dated Jan. 7, 2014.
Korean Patent Application 10-2012-7011701 filed on Oct. 22, 2010, Office Action dated Oct. 18, 2016.
Korean Patent Application 10-2012-7011701 filed on Oct. 22, 2010, Office Action dated Apr. 28, 2017.
Indian Patent Application 3532/DELNP/2012 filed on Oct. 22, 2010, Office Action dated Sep. 26, 2018.

(56) References Cited

OTHER PUBLICATIONS

Korean Patent Application 10-2017-7021802 filed on Oct. 22, 2010, Office Action dated Nov. 2, 2017.
Korean Patent Application 10-2017-7021802 filed on Oct. 22, 2010, Office Action dated May 31, 2018.
PCT Patent Application PCT/US2010/053703 filed on Oct. 22, 2010, International Search Report and Written Opinion dated Dec. 23, 2010.
European Patent Application 10830413.0 filed on Oct. 22, 2010, Search Report dated Nov. 13, 2014.
European Patent Application 10830413.0 filed on Oct. 22, 2010, Search Report dated Jul. 27, 2018.
Canadian Patent Application 2,777,940 filed on Oct. 22, 2010, Office Action dated Jun. 15, 2016.
Chinese Patent Application 201080049186.X filed on Oct. 22, 2010, First Office Action dated Jun. 3, 2014.
Chinese Patent Application 201080049186.X filed on Oct. 22, 2010, Second Office Action dated Apr. 16, 2015.
Chinese Patent Application 201080049186.X filed on Oct. 22, 2010, Third Office Action dated Dec. 22, 2015.
Japanese Patent Application 2012-536898 filed on Oct. 22, 2010, Office Action dated Jan. 14, 2014.
Japanese Patent Application 2012-536898 filed on Oct. 22, 2010, Office Action dated Dec. 2, 2014.
Japanese Patent Application 2012-536898 filed on Oct. 22, 2010, Notice of Allowance dated Jun. 23, 2015.
Korean Patent Application 10-2012-7011238 filed on Oct. 22, 2010, Office Action dated Oct. 18, 2016.
Korean Patent Application 10-2012-7011238 filed on Oct. 22, 2010, Office Action dated Jan. 31, 2017.
Indian Patent Application 3529/DELNP/2012 filed on Oct. 22, 2010, Office Action dated May 7, 2018.
PCT Patent Application PCT/US2011/62220 filed on Nov. 28, 2011, International Search Report and Written Opinion dated Apr. 2, 2012.
European Patent Application 1184554.2 filed on Nov. 28, 2011, Search Report dated May 23, 2016.
Chinese Patent Application 201180052563.X filed on Nov. 28, 2011, First Office Action dated Jul. 9, 2015.
Chinese Patent Application 201180052563.X filed on Nov. 28, 2011, Second Office Action dated Mar. 2, 2016.
Japanese Patent Application 2013-536942 filed on Nov. 28, 2011, Office Action dated May 7, 2014.

\* cited by examiner

DETECTING EXPIRED CONTENT WITHIN SLOTS IN A USER INTERFACE

CROSS-REFERENCE TO RELATED APPLICATIONS

This application is a continuation of, and claims priority to, co-pending U.S. Patent Application entitled "DETECTING EXPIRED CONTENT WITHIN SLOTS IN A USER INTERFACE," filed on Sep. 24, 2015, and assigned application Ser. No. 14/864,313, which is incorporated herein by reference in its entirety.

BACKGROUND

A network site may include any number of content pages, such as web pages. A site for a search engine provider may include one or more content pages for search results generated by the search engine. A network site for an online retailer may include, for example, one or more content pages for each category of items offered for order by the online retailer as well as other content pages. When a request to generate a content page is received from a client device via a browser, for example, the network site can personalize the content placed in the content page depending upon various factors. In some scenarios, expired content may inadvertently be placed within a content page, such as content that relates to expired promotional content.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1A:
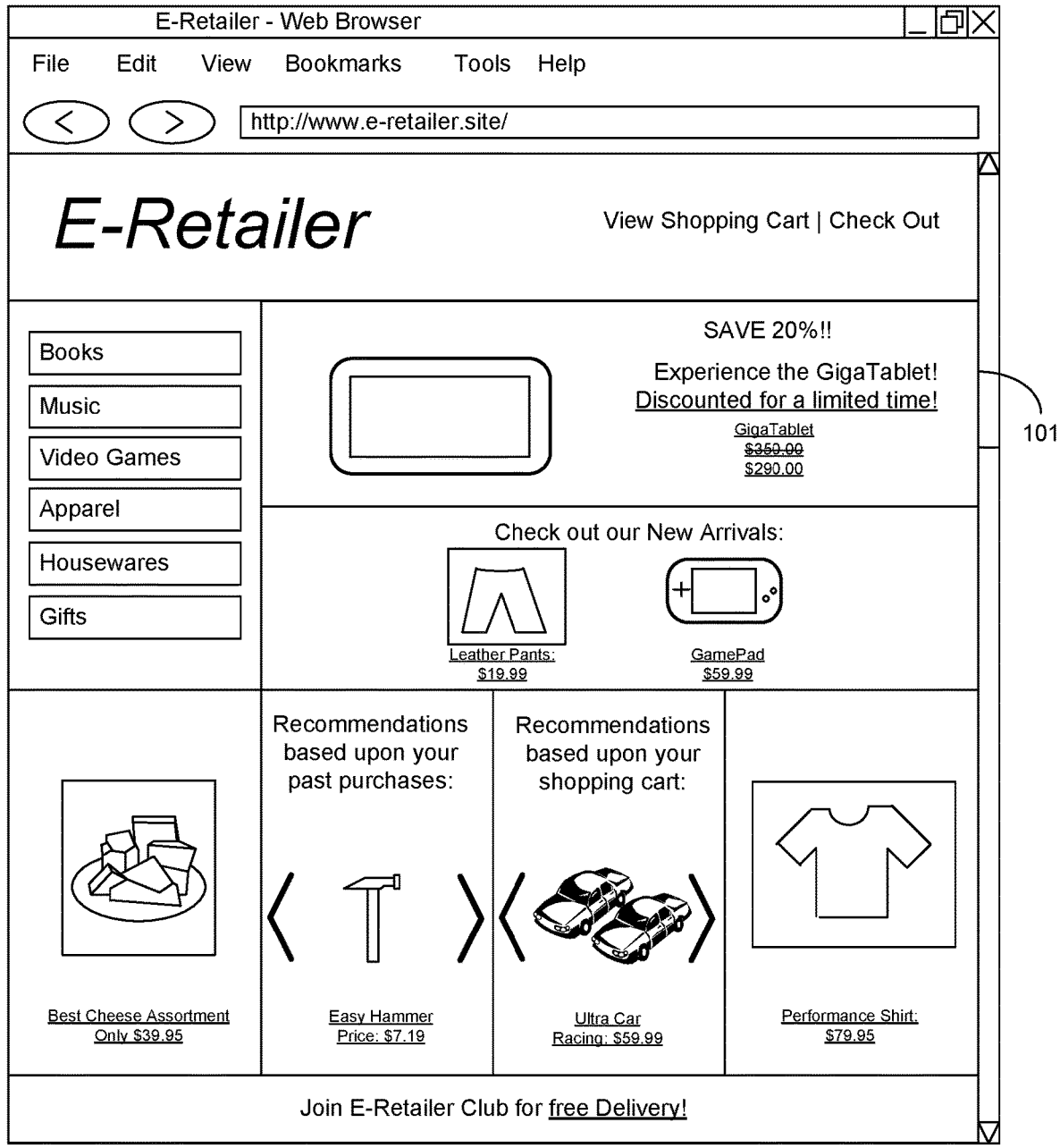
FIGS. 1A-1B are drawings of an example user interface employed in the networked environment of FIG. 1 according to various embodiments of the present disclosure.

Embodiments of the present disclosure are directed to placement of content, such as user interface widgets, within page slots defined by a page template that is associated with a particular content page of a site. Embodiments of the disclosure can select user interface widgets for placement within a content page from among multiple candidates. In the case of a content page generated for an online retailer site or electronic commerce system, a widget can be selected based upon an effectiveness metric related to the profit and/or revenue generated by the user interface widget in relation to other user interface widgets. User interface widgets can also be matched with page slots in a content page based in part upon a placement value of each of the page slots within a given page template. Additionally, page slots can also be segmented into various slot groups in which user interface widgets can be selected for placement in response to a request to generate a content page.

Although the various embodiments herein are described in the context of a network site configured for an online retailer, it is understood that the principles disclosed herein may apply to any type of network site (e.g., search engine, social networking system, etc.) that could benefit from selection and/or placement of user interface widgets in content pages in a page pipeline depending upon any type of ranking of the user interface widgets according to any metric. Additionally, although embodiments of the disclosure are primarily described herein in the context of placing user interface widgets within slots of a page pipeline that corresponds to visual content, it is also understood that the principles disclosed herein may apply to various types of content that can be arranged in a pipeline format. Other variations and examples of placing user interface widgets in page slots are also discussed in U.S. patent application Ser. No. 13/555,388, filed Jul. 23, 2012, U.S. Pat. No. 8,949,712, and U.S. patent application Ser. No. 14/609,799, filed Jan. 30, 2015, all of which are hereby incorporated by reference herein in their entireties.

A pipeline can also represent a behavior pipeline that represents various actions or presentations of content with regard to a user that are expected. For example, a behavior pipeline can represent the presentation of an advertisement or other content to a user, followed by the user's purchase of a product related to the content from an electronic commerce site or a brick and mortar store, followed by the user's subsequent interactions with another site in which content can be presented to the user. Each stage of such a behavior pipeline can be associated with content slots, or opportunities where content in various forms can be presented to the user.

A page slot, or content slot, can be embedded with content that has an expiration date or some other expiration condition, such as a campaign budget. Accordingly, embodiments of the disclosure can prevent or reduce the likelihood of content that is expired from being placed within a page slot and included in a resultant content page that is sent to a client device of a user.

Referring to FIG. 1A, shown is an example user interface 100 corresponding to a content page that incorporates various page slots in which different pieces of content are placed. The page slot 101 represents a portion of the user interface 100 in which content can be scheduled for placement on a rotating or periodic basis by a site designer, administrator, advertiser, or other type of user. In the depicted example, the content placed within the page slot 101 corresponds to promotional content that is associated with an expiration date or a limited campaign budget. In one example, the promotional content represents markup language that includes a link to a promotional landing page where a user can find additional information about the depicted promotional content.

However, the content in the page slot 101 may be close to or has already expired. For example, an advertiser may associate a campaign budget with a particular promotion such that when the budget is exhausted, or when a threshold number of users have taken advantage of the promotion, followed a link embedded within the content in the page slot 101, or when a threshold number of units associated with the promotion have been sold, the promotion ends. When the promotion ends, the content to which the link in the page slot links can be considered expired.

However, if the user interface 100 is generated with expired content in the page slot 101, this can result in a less than desirable user experience. Including expired content within the page slot 101 may also result in users who exit the site or seek alternative sites to view content or purchase items. Accordingly, embodiments of the disclosure can limit or prevent incorporating content that is expired or close to expiration in page slots to improve user engagement and prevent users from exiting the site.

Figure 1B:
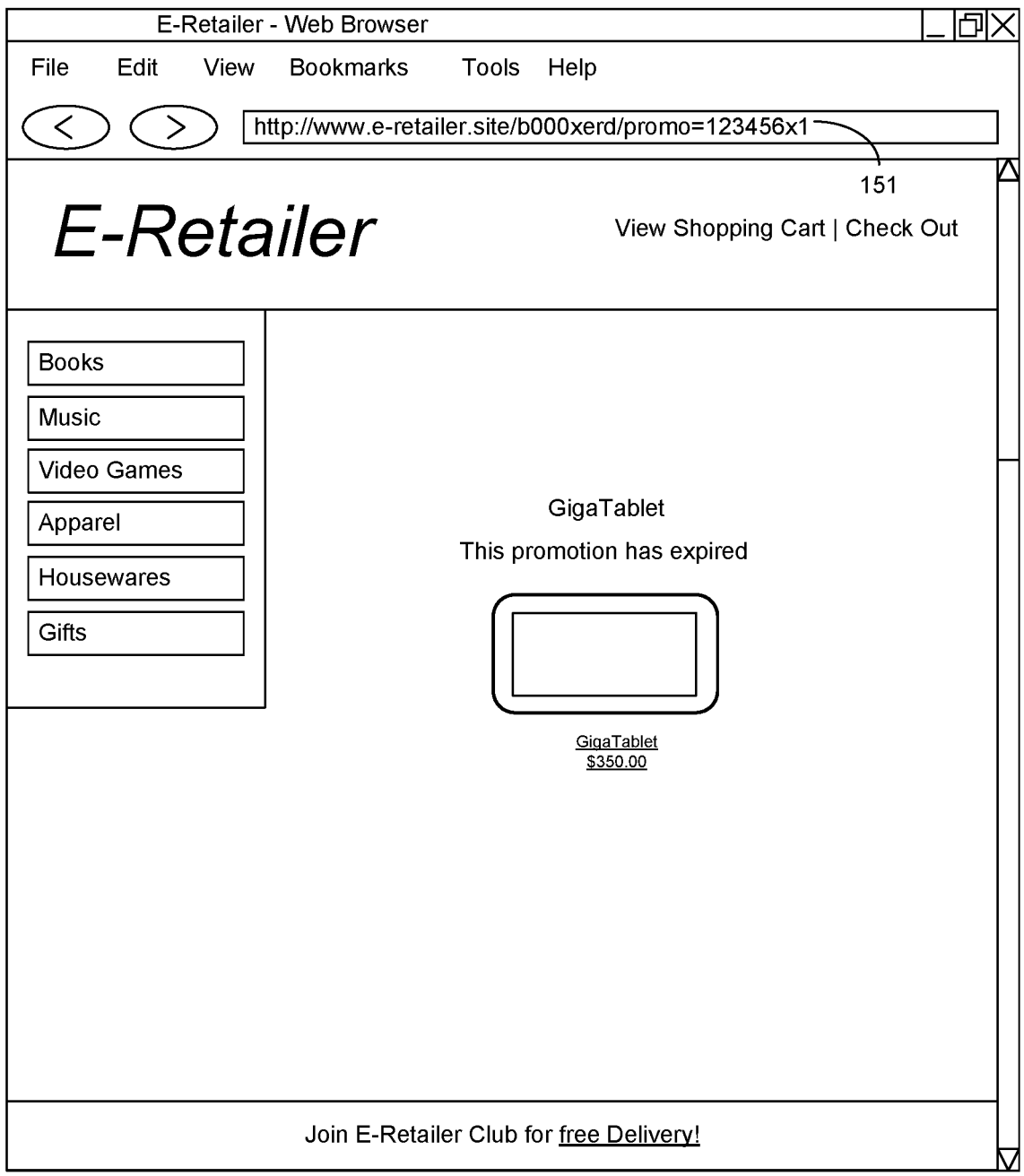

Referring to FIG. 1B, shown is a user interface 150 that is generated when a user follows a link embedded in the page slot 101 to a promotional landing page of other type of page in the page slot 101 of FIG. 1A. In the example of FIG. 1B, the link in the page slot 101 of FIG. 1A links to a landing page for content that has expired. Accordingly, such a user experience is less than desirable and can also result in customer service complaints. In the depicted example, a content identifier 151, which can correspond to a promotional identifier or other type of identifier for the link, can be analyzed to determine whether the page corresponding to the link is expired content.

Figure 2:
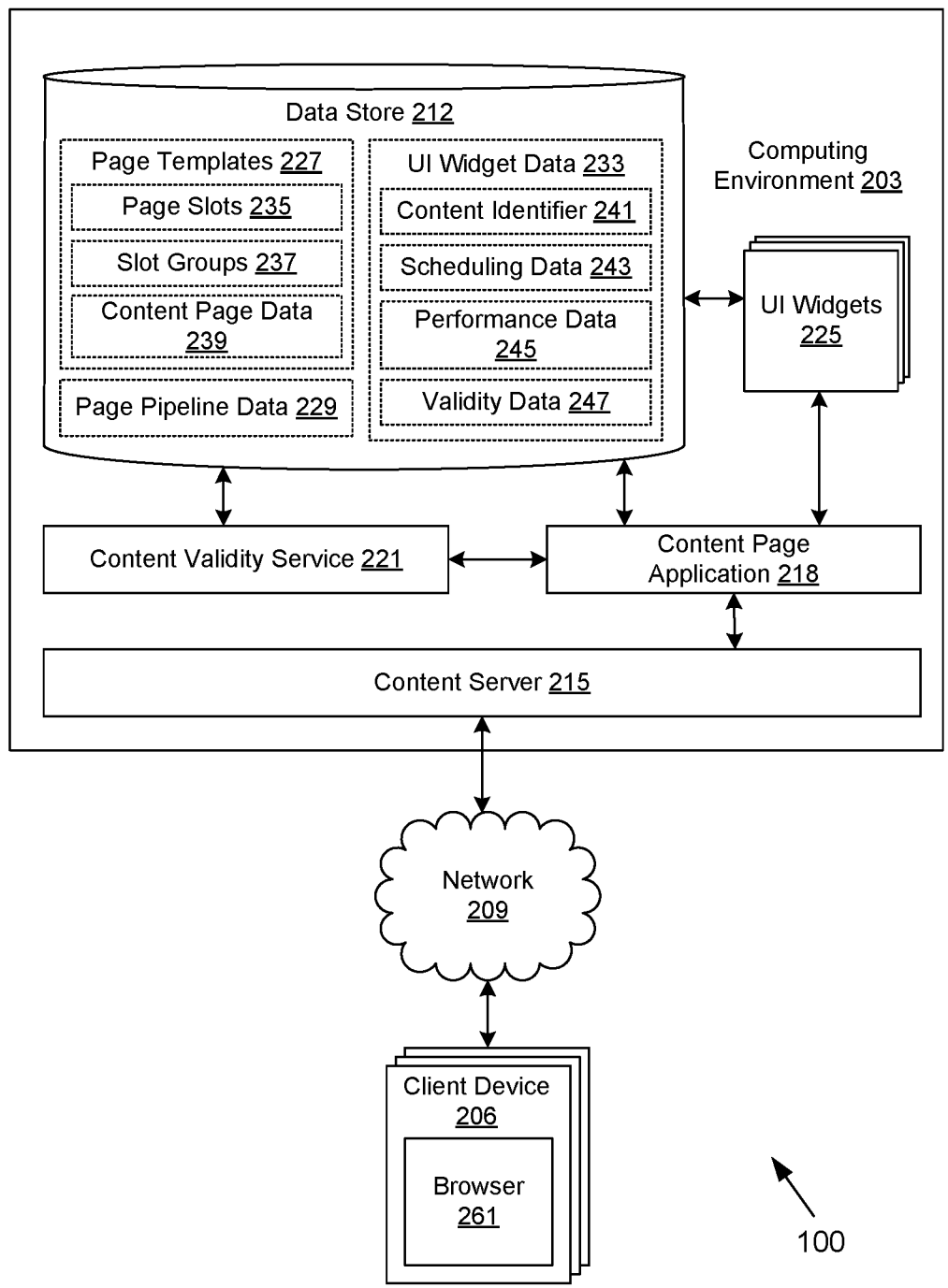
FIG. 2 is a drawing of a networked environment according to various embodiments of the present disclosure.

With reference to FIG. 2, shown is a networked environment 200 according to various embodiments. The networked environment 200 includes a computing environment 203 that is in data communication with one or more client devices 306 by way of a network 209. The network 209 includes, for example, the Internet, intranets, extranets, wide area networks (WANs), local area networks (LANs), wired networks, wireless networks, or other suitable networks, etc., or any combination of two or more such networks.

The computing environment 203 may comprise, for example, a server computer or any other system providing computing capability. Alternatively, the computing environment 203 may employ a plurality of computing devices that are arranged, for example, in one or more server banks or computer banks or other arrangements. Such computing devices may be located in a single installation or may be distributed among many different geographical locations. For example, the computing environment 203 may include a plurality of computing devices that together may comprise a cloud computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores as can be appreciated. The data stored in the data store 212, for example, is associated with the operation of the various applications and/or functional entities described below.

The components executed on the computing environment 203, for example, include a content server 215, a content page application 218, a content validity service 221, user interface (UI) widgets 225, and other applications, services, processes, systems, engines, or functionality not discussed in detail herein. The content server 215 is executed to receive content page requests from the client device 206 over the network 209, and to serve up content pages in response to the content page requests. The content server 215 may comprise a web server application such as Apache Hypertext Transfer Protocol (HTTP) Server, Microsoft® Internet Information Services (IIS), and/or any other type of content page server or web server application or service.

The content page application 218 generates content pages in response to a content page request received by the content server 215 to generate a requested content page. The content page application 218 can dynamically assemble a content page from a page template 227 by generating a page in which content generated from various user interface widgets are placed. The content can be placed depending upon various factors associated with the request as will be described herein. In one embodiment, the content page application 218 includes an interpreter for JavaServer Pages (JSP) that generates a content page, such as a hypertext markup language (HTML) page from a JSP page that defines how the HTML page should be dynamically generated.

User interface (UI) widgets 225 define one or more functional applications and/or services that can be executed to provide dynamic content for placement within a content page. As a non-limiting example, a UI widget 225 can generate markup language that is placed within a content page generated by the content page application 218 in response to a request to generate a content page received from a client device 206. The markup language can include one or more links to content that, in some instances, is associated with an expiration date or another factor that causes expiration, such as a limited campaign budget or a limited number of hits.

In one embodiment, a UI widget 225 can comprise JavaScript code or other client-side code that places data within a content page generated from a page template 227. In one embodiment, a UI widget 225 may comprise code that is executed by the content page application 218 to retrieve product recommendations as well as hyperlinks, text and imagery associated with the recommendations that can be placed in the content page. In this example, the product recommendations can be tailored to a user account associated with a user. Thus, the UI widget 225 can detect a user account associated with a browser session, obtain product recommendations generated by a product recommendation engine and generate markup language that corresponds to content related to the recommendations in the content page.

In some embodiments, UI widgets 225 can be implemented as various services that listen for an event associated with a request to generate a content page that is received by the content server 215. In some embodiments, the UI widgets 225 can also listen for an identity of a page pipeline in which a user and/or request is placed. When the content server 215 and/or content page application 218 receives such a request, the UI widgets 225 can initiate content placement requests that represent requests to schedule content for placement within the content page that is generated in response to a page request received from or on behalf of the client device 206. In response to a content placement request from UI widgets 225, the content page application 218 can select markup language generated by certain UI widgets 225 for placement in the content page based upon an effectiveness metric associated with the UI widgets 225 initiating such a request as well as other considerations. The content page application 218 can also select markup language generated by a particular UI widget 225 in response to whether the widget corresponds to content scheduled for placement in a content page on behalf of an advertiser as a part of a promotional campaign.

In some scenarios, the content page application 218 can generate a ranking of UI widgets 225 with respect to a known set of available UI widgets 225 based upon performance data and scheduling data that is stored in the data store 212 without receiving a scheduling request from a UI widget 225 that is implemented as a service that listens for requests to generate content pages. In this scenario, the content page application 218 can select certain UI widgets 225 according to data stored in the data store 212 and request the selected UI widgets 225 to generate markup language for placement within a content page based upon the scheduling data, effectiveness metric and/or content placement value with respect to a page pipeline, page slots within a page pipeline, and/or properties of a page pipeline in which a user associated with a content page request is placed.

In some embodiments, instead of employing a content server 215, an application implementing a call center touchtone workflow, a braille reader, a video streaming service, or any other form of content delivery application can be employed. Accordingly, the content page application 218 can facilitate placement of content in any type of content pipeline, such as in a pipeline of content in a call center environment in which touchtone inputs and/or voice commands are obtained from a user. As another example, the content page application 218 can also optimize placement of content from UI widgets 225 in a braille reader environment, where the page templates correspond to pages in a pipeline of braille content, and page slots correspond to content that can be presented in each page of the pipeline of braille content. As another example, the content page application 218 can optimize placement of content within a video stream. In this scenario, the page pipeline can represent various points in time within a piece of video content, and the page slots can correspond to locations within a user interface in which a video stream is presented during the running time of the video content. Therefore, it should be appreciated that while the examples discussed herein related to a page pipeline of a series of content pages presented in a web server environment or within an application environment in which content is shown on a display in page form, the content page application 218 can optimize content of any kind in any type of content pipeline.

In this sense, a page slot can also be referred to as a content slot. A content slot can represent any place, location, user interface, output device, or any mechanism by which content in any form, such as audio, video, or any other user experience, can be presented to a user. For example, a content slot can represent a channel or location on a screen of an interactive television experience and a UI widget 225 can generate a commercial or other visual advertisement for placement within the interactive television experience. Additionally, as noted above, the content page application 218 can identify a behavior pipeline in which a user can be placed, where the behavior pipeline can include various stages that are each associated with one or more content slots. Each of these stages can represent any type of event that can be tracked by the content page application 218, whether such an event includes the requesting and/or generation of a content page, video stream, audio stream, or any other type of content, or an external event such as an event related to the user's location or the user's taking of any type of action (e.g., purchasing a product from a brick and mortar store).

Each of the stages of a behavior pipeline can also be associated with content slots, which represent opportunities at which the content page application 218 can present content to the user. The content slots in a behavior pipeline can also be associated with a placement value, and a UI widget 225 can represent any other form of content or interaction with the user that can be facilitated by the content page application 218 within the context of the behavior pipeline. Accordingly, the content page application 218 can also optimize the presentation of content in such a behavior pipeline according to various embodiments of the disclosure.

The content validity service 221 can determine whether content associated with a UI widget 225 is valid or unexpired. The content validity service 221 can evaluate data stored in the data store 212 that identifies an expiration date or a campaign budget associated with markup language or other content generated by a UI widget 225. As another example, the content that might expire is an image that is associated with an expiration date. In this scenario, the content validity service 221 can determine whether an image is expired or has been replaced with another image. If the image is expired, the content validity service 221 can reply with an indication that the image is expired and identify an alternative image or alternative UI widget 225 that can be used instead.

In one embodiment, the content validity service 221 can provide an application programming interface (API) through which an API call can be made. The API call can include a content identifier, such as a promo identifier or other unique identifier with which content can be identified. The content validity service 221 can respond to such an API call with an indication of whether the content associated with the content identifier is expired or not. In some instances, if the content is expired, the content validity service 221 can provide an identity of an alternative UI widget that should be employed. In other instances, if the content is expired, the content validity service 221 can provide an identity of a related UI widget that should be employed based upon a calculated relevance metric with respect to the UI widget of the requested content identifier.

The data stored in the data store 212 includes, for example, page templates 227, page pipeline data 229, and user interface widget data 233. Page templates 227 can specify the placement of user interface elements with which a user on a client device 206 can interact. As a non-limiting example, in an electronic retail site implemented by the computing environment 203, the page templates 227 can specify the placement of text, imagery, buttons, etc., which can include user interface elements that facilitate the purchase of an item (e.g., an "Add to Cart" button). As an alternative example, a page template 227 for a search engine implemented by the computing environment 203 can specify where imagery, search forms, search results, etc. are placed on a content page generated by the content page application 218 for a user on a client device 206.

Page templates 227 also include one or more page slots 235 that specify locations within a content page in which content such as UI widgets 225 can be placed. Page slots 235 can also be associated with a placement value that indicates a value of a particular page slot 235 relative to other page slots 235 that are within a page template 227. Page slots 235 can also be associated with a placement value that indicates a value of a particular page slot 235 relative to other page slots 235 that are within page pipeline comprising a collection of multiple content pages and/or page templates 227. The placement value can represent a metric that is linked with an amount of user attention that a particular page slot is predicted to receive based upon its location in a content page. For example, a top center page slot may be associated with the highest placement value because it may receive the highest amount of user attention as compared to a page slot in a footer location. Additionally, a placement value can also take into account one or more other factors, such as a click rate associated with the page slot 235, a conversion rate associated with content placed in the page slot 235, and/or economic factors, such as a profitability or revenue metric associated with the page slot 235. The placement value can also take into account other engagement metrics associated with a page slot 235, such as an amount of time that a population of users of a site interacts with the page slot 235 relative to other page slots 235 in the page template 227. Such an engagement metric can be represented by a mouse hover time associated with the page slot 235 or any other form of user interaction with a location within a page template 227. Accordingly, the page slots 235 of a particular page template 227 can be effectively ranked within a page template 227 according to the placement value associated with each page slot 235.

Page slots 235 can also be grouped into slot groups 237. A slot group 237 can include multiple page slots 235 that possess a common characteristic, such as a geometry of the page slot 235, proximity of the page slots 235 relative to one another, and/or placement values of the page slots 235. For example, page slots 235 having a common geometry can be assigned to a common slot group 237. Accordingly, the UI widgets 225 that are candidates for placement within the page slots 235 can be chosen to produce markup language for the common geometry and without regard to a particular page slot 235 within the slot group 237 in which the UI widget 225 is placed. The content page data 239 includes content pages and components thereof which are static or not otherwise generated by the content page application 218 such as images, strings, and other data incorporated into a content page.

Page pipeline data 229 includes information about page pipelines, which comprise an ordered collection of multiple content pages associated with page templates 227 that are linked together in some way. For example, a page pipeline can comprise an ordered collection of content pages that a user is likely to traverse in a site facilitated by the content page application 218. In this scenario, the page pipeline can include a site homepage, a search results page, and a product detail page, as a many users are likely to progress through an electronic commerce site in such a fashion. A page pipeline can also include an action that is expected and/or hoped that to user takes, such as addition of a product to a shopping cart, purchase of a product, following of a hyperlink presented to the user, and/or any other action that is relevant to a content page presented to a user as can be appreciated.

Page pipeline data 229 can also identify one or more probabilities that users will progress from each page in the page pipeline to the next page in the pipeline. Page pipeline data 229 can also identify one or more probabilities that users will progress from each page in the page pipeline to other states, such as abandonment of the page pipeline and/or entry into another page pipeline. In this sense, a page pipeline can be represented by a Markov chain in which each content page in a page pipeline is represented as a possible state in the Markov chain, and the transitions from one page to the next page and/or another type of state (e.g., abandonment, expected action) are associated with the probability that user will advance to a possible state in the page pipeline.

In some embodiments, page pipeline data 229 can also represent information about any other type of content pipeline, such as a call center workflow through a user progresses when calling a call center. In this scenario, the content server 215 and content page application 218 are configured to implement a call center workflow in which a user contacts a call center and is led through various prompts and/or menus at which voice and/or touchtone inputs are provided by the user. Accordingly, each stopping point at which user input is solicited can be viewed as a "content page" in the context of this disclosure, and the various voice prompts that are presented to the user can represent a UI widget in the context of this disclosure. Therefore, the prompts that are presented to the user can include information related to the purpose of the user's call as well as ancillary information, such as advertising content. These prompts can be optimized by determining an effectiveness metric of a given prompt as described herein.

As another example, page pipeline data 229 can also represent information about a video stream that can be presented to a user. In this scenario, a content page can represent a particular point in time and/or time window within a piece of video content, and a page slot can represent a portion of a user interface in which the video content is presented and in which content that is generated by UI widgets 225 can be placed. Other examples of content pipelines can also be optimized by the content page application 218 according to various embodiments of the disclosure.

The data store 212 also includes various user interface widget data 233 such as images, strings, video, links, and other data that can be incorporated into markup language generated by a user interface widget 225. The markup language can be placed within a content page based upon a page template 227. Widget data 233 can also include one or more content identifier 241 associated with markup language generated by a UI widget 225. A content identifier 241 can uniquely identify content that is generated by a UI widget 225. A content identifier 241 can be embedded within the markup language generated by the UI widget 225 for placement within a content page. For example, a content identifier 241 can be embedded within a uniform resource locator (URL) that links to a promotional landing page associated with a promotional campaign. As another example, the content identifier 241 can be a product identifier that identifies a landing page for a product in a product catalog. The content identifier 241 can include a unique identifier that can be included within a URL query string as a parameter or parameter value. The content page application 218 can identify a content identifier 241 that is embedded within markup language generated by a UI widget 225 in order to determine whether content generated by the UI widget 225 has expired.

Scheduling data 243 and performance data 245 are associated with the various UI widgets 225 that can be requested to generate markup language for placement within one or more page slots 235. Scheduling data 243 can include scheduling constraints and/or requirements regarding the placement of UI widgets 225 within a content page generated by the content page application 218. For example, scheduling data 243 can specify a percentage of content pages corresponding to a specific page template 227 in which a UI widget 225 should be placed due to business reasons, aesthetic factors, or any other factors. For example, scheduling data 243 can be employed to manually override selection of UI widgets 225 for placement within a content page generated by the content page application 218 irrespective of the ranking of a UI widget 225 according to an effectiveness metric when an advertiser or another entity has requested placement of specific content in a content page generated for visitors of a site.

Performance data 245 can provide performance data associated with the various available UI widgets 225 according to the effectiveness metric. Accordingly, the content page application 218 can also select UI widgets 225 based upon the performance data 245 and request that certain UI widgets 225 generate markup language for placement within a content page based upon the performance data 245 as well as scheduling constraints defined by the scheduling data 243.

Validity data 247 identifies how long content generated by a particular UI widget 225 remains valid. Validity data 247 can specify an expiration date or an expiration timestamp that identifies a day and time after which the content generated by the UI widget 225 or referenced by links generated by the UI widget 225 expire. Validity data 247 can also specify a campaign budget associated with a promotional or advertising campaign. The campaign budget can be depleted by purchases of a particular item from an electronic commerce site, by a number of clicks, hits or impressions generated by a link included within content created by the UI widget 225. When a user of a client device 206 follows a link generated by the UI widget 225 or purchases an item associated with a promotional campaign, the campaign budget stored in the validity data 247 can be reduced, or moved closer toward expiration. Validity data 247 can specify whether a product associated with a content identifier 241 represents a product that is still available in a product catalog or whether the product has expired.

The client device 206 is representative of a plurality of client devices that can be coupled to the network 209. The client device 206 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability.

The client device 206 may be configured to execute various applications such as a browser 261 and/or other applications. The browser 261 may be executed in a client device 206, for example, to access and render content pages, such as web pages, or other network content served up by the computing environment 203 and/or other servers. The client device 206 may be configured to execute applications beyond browser 261 such as, for example, email applications, instant message applications, and/or other applications.

Next, a general description of the operation of the various components of the networked environment 200 is provided. To begin, a browser 261 executed in a client device 206 can generate a request to generate a content page, which is transmitted via the network 209 to the content server 215. The content server 215 can request creation of the content page by the content page application 218, which identifies a particular page template 227 associated with the requested content page and dynamically generates a content page. The content page can then be transmitted to the client device 206 by the content server 215.

Accordingly, to generate such a content page in response to receiving a request to generate a content page, the content page application 218 selects UI widgets 225 for placement in the content page. In order to select the appropriate UI widgets 225 for placement within the content page, the content page application 218 identifies a page pipeline in which to place a user corresponding to the requested content page based upon the arrival characteristics of the request. The arrival characteristics can comprise user profile data of a user account of a user associated with the content page request. The arrival characteristics can take into account the history of a user with respect to a given site (e.g., purchase history, browse history, etc.). The arrival characteristics can also include a referrer link, user session data, or any other contextual data related to a request to generate a content page that is received by the content page application 218.

Accordingly, upon detecting the arrival characteristics of a request to generate a content page, the content page application 218 places a user corresponding to the request into a page pipeline based upon the arrival characteristics. As noted above, the page pipeline specifies various probabilities that a user may progress to subsequent states of the page pipeline. A page pipeline can also represent a particular activity or context associated with a request to generate a content page. Accordingly, the content page application 218 can identify an activity or context associated with the arrival characteristics. For example, the content page application 218 can identify a purpose of a user in requesting a content page and present content in the page slots that are optimized based upon the identified purpose. For example, the content page application 218 may be able to identify, based upon the arrival characteristics, a product and/or class of products that a user is browsing. In such a scenario, the content page application 218 can generate a ranking of UI widgets 225 based on how they relate to the product and/or class of products that the user is seeking.

In other embodiments, the content page application 218 can calculate the effectiveness metric of the various UI widgets 225 that are scheduled for placement within the page pipeline according to the scheduling data 243 according to an effectiveness metric or placement score, which, as noted above, can be related to profitability, revenue, or any other metric as can be appreciated. An effectiveness metric can also be related to a volume of items sold by a particularly UI widget 225 in an electronic commerce system. The effectiveness metric can also relate to an engagement metric, such as a click-through rate associated with a particular UI widget 225. Another example of such an engagement metric is a dwell time, or an amount of time that a population of users of a site focus their attention (e.g., hovers a mouse pointer above or near a UI widget 225, etc.), on a particular UI widget 225 relative to other UI widgets 225. The engagement metric can further relate to a conversion rate of a UI widget 225, where conversion of a user can be defined in various ways. For example, conversion of a user can correspond to engagement or interaction with a widget, whether the UI widget 225 results in the sale of a particular item in an electronic commerce system, or any other type of user conversion as can be appreciated. The effectiveness metric can also be related to minimizing an abandonment rate associated with the page pipeline or maximizing the probability that a user advances to a subsequent stage of a page pipeline.

Accordingly, the performance data 245 can define the effectiveness metric associated with the various widgets upon which a ranking can be based. Calculation of such a score and ranking of UI widgets 225 according to a calculated score can also be accomplished as described in U.S. patent application Ser. No. 11/758,932 filed Jun. 6, 2007 and entitled "Real-time Adaptive Probabilistic Selection of Messages," which is incorporated herein by reference in its entirety. The effectiveness metric can also include some degree of randomness so that lowly ranked UI widgets 225 and/or new UI widgets 225 receive an opportunity for placement within content pages. Additionally, the matching of UI widgets 225 with page slots 235 and/or slot groups 237 can also be accomplished as described in U.S. patent application Ser. No. 13/555,388, filed Jul. 23, 2012, entitled "Assigning Slots to User Interface Elements," which is incorporated herein by reference in its entirety.

The content page application 218 can also evaluate scheduling data 243 to identify UI widgets 225 that should be selected for placement within a content page. As noted above, certain content, or certain UI widgets 225, can be scheduled for placement within content pages by an advertiser, a promotional campaign or for other reasons that are not solely related to effectiveness metric data. Accordingly, the scheduling data 243 can identify demographic data for users in which content should be placed, frequency of placement, a volume of placement, and other metrics that define when a particular UI widget 225 should be scheduled for placement within a content page. In this sense, the scheduling data 243 can override the performance data 245 such that a UI widget 225 can be assigned a higher ranking or priority than another widget that has a higher effectiveness metric.

In either scenario, in response to receiving a request to generate a content page, the content page application 218 can generate a ranking of the UI widgets 225 according to the effectiveness metric of the various UI widgets 225 and the scheduling data 243.

The content page application 218 can then select the highest ranked UI widgets 225 and request that the highest ranked UI widgets 225 generate markup language for placement within available page slots 235 defined by the page templates 227 of pages making up the page pipeline. In some embodiments, the content page application 218 can also place the UI widgets 225 into the page slots 235 so that the highest ranked UI widget 225 is placed in the page slot 235 having the highest placement value in the page pipeline, the second highest ranked UI widget 225 is placed in page slot 235 having the second highest placement value in the page pipeline, and so on. Accordingly, once UI widgets 225 are matched with page slots 235 across an entire page pipeline, the requested content page can be generated with the UI widgets 225 assigned to the page slots 235 within content page. In this way, the content page application 218 can optimize placement of UI widgets 225 across an entire page pipeline rather than just within a single page slot that may be defined by the page template 227.

It should be appreciated that some UI widgets 225 considered for placement within the page pipeline may fail to achieve a high enough ranking relative to other UI widgets 225 and that these UI widgets 225 may fail to gain placement within a page of the page pipeline. In other words, there may be more UI widgets 225 considered for placement within the page pipeline than there are available page slots 235. In some scenarios, a single UI widget 225 can be associated with multiple requests to place content within a page pipeline. For example, a UI widget 225 can be configured to generate multiple types of content for placement various location in a content page as well as in various pages in a page pipeline. A UI widget 225 configured to generate product recommendations in an online retail site may generate recommendations related to a user's purchase history when invoked a first time in a page pipeline and then may generate recommendations related to recently viewed products by the user when invoked a second time in the page pipeline.

Additionally, in some embodiments, the content page application 218 can also consider the various UI widgets 225 for placement within the various slot groups 237 defined by the page template 227 in a page pipeline according to one or more properties associated with each of the slot groups 237. The content page application 218 can then generate a ranking of UI widgets 225 considered for placement in a particular slot group 237 according to the performance data 245 and scheduling data 243. In some cases, a slot group 237 may also traverse multiple pages in a page pipeline. Accordingly, the page pipeline data 229 can link slot groups 237 in multiple page templates 227 together with one another.

The properties associated with each of the slot groups 237 can comprise one or more properties shared by the page slots 235 within the slot groups 237, such as, geometry of the page slots 235, location of the page slots 235 within the page template 227, a placement value range, or other properties of a page slot 235 as can be appreciated. Upon generating a ranking of the UI widgets 225 for each of the slot groups 237, the content page application 218 assigns the UI widgets 225 to page slots 235 within the slot groups 237 according to the ranking and placement value of the page slots 235. For example, a highest ranked UI widget 225 is assigned to a page slot 235 within a slot group 237 having the highest placement value, a second highest ranked UI widget 225 is assigned to a page slot 235 within the slot group 237 having the second highest placement value, and so on.

Upon assigning a UI widget 225 to a particular page slot 235 in a content page that is in a given page pipeline according to the ranking of the UI widget 225 as well as placement value of the page slot 235, the content page application 218 can request that the UI widgets 225 generate markup language for placement within their assigned page slots 235. In one embodiment, the content page application 218 can initiate these requests in parallel to speed the time required for generation of a content page. In some embodiments, the content page application 218 can initiate these requests for subsequent pages in the page pipeline even before the user visits the subsequent pages as a form of prefetching content for placement in the subsequent content page.

Additionally, the markup language generated by certain UI widgets 225 may be dependent upon the ranking of the UI widget 225 relative to other UI widgets 225 that are selected for placement within a page template 227 as well as the relative position of page slots 235 and/or a page template 227 within a page pipeline. Accordingly, the content page application 218 can provide to a UI widget 225 its ranking relative to other widgets scheduled for placement in the request to generate markup language. In some embodiments, the content page application 218 can provide a listing of the UI widgets 225 that are ranked above a particular UI widget 225 according to the effectiveness metric.

In some scenarios, one or more of the UI widgets 225 placed in a page slot 235 of the page template 227 corresponding to the requested content page may experience an error that causes generation of the markup language to fail. Accordingly, in such a scenario, the content page application 218 can select a next highest ranked UI widget 225 according to the effectiveness metric and request that the next highest ranked UI widget 225 generate markup language for placement within the content page. The content page application 218 can provide in the request an identity of the UI widgets 225 that are, at the time of failure, ranked above the UI widget 225 according to the effectiveness metric in the event that the next highest UI widget 225 is context aware.

Upon obtaining markup language generated by the UI widgets 225 selected for placement within page slots 235 in a particular content page, the content page application 218 can evaluate whether any of the UI widgets 225 generated content that has expired. To make this evaluation, the content page application 218 can determine whether the markup language contains or references content that is expired.

In one scenario, the markup language generated by the UI widget 225 may include a link or reference to another content page, such as a promotional landing page, that corresponds to an expired promotion. To detect this scenario, the content page application 218 can determine whether a URL contained within the markup language contains a content identifier 241, such as a promotional identifier or any other type of identifier that can uniquely identify the content page to which the URL points. The promotional identifier or other type of identifier, in one scenario, can correspond to a promotion associated with an item in a product catalog associated with an electronic retail site. However, it should be appreciated that the content identifier 241 can be associated with any other type of content The content page application 218 can then generate and transmit an API call to the content validity service 221 requesting a determination of whether the content identifier 241 corresponds to expired content. The content validity service 221 can respond to such a request with an indication of whether the content identifier 241 corresponds to expired content. The content validity service 221 can make such a determination of an expiration date identified by the validity data 247 has passed or if a campaign budget has been exhausted or exceeded. If one or more content identifiers 241 embedded within URL's or other portions of the markup language correspond to expired content, the content page application 218 can suppress rendering of the markup language in the content page that is provided to the content server 215 for transmission to the client device 206.

In some scenarios, the content identifier 241 may correspond to content that is soon to expire. For example, if a current time is within a threshold amount of time from the expiration date, the content validity service 221 can report the content as expired content. As another example, if a campaign budget associated with the UI widget 225 is within a threshold amount of exhaustion, the content validity service 221 can report the content as expired content. In such a scenario, the content page application 218 can suppress rendering of the markup language in the content page that is provided to the content server 215 for transmission to the client device 206.

The content page application 218 can suppress rendering of markup language generated by a UI widget 225 that corresponds to expired content in multiple ways. In one example, the content page application 218 can avoid including the markup language generated by the widget 225 in its assigned page slot 235. In another example, the content page application 218 can remove the UI widget 225 from the ranked list of UI widgets 225 and select an alternative UI widget 225 for inclusion in the content page.

In one embodiment, the content validity service 221 can identify an alternative UI widget 225 that the content page application 218 can select if a particular content identifier 241 corresponds to expired content. In this scenario, the content page application 218 can replace the UI widget 225 associated with expired content with the alternative UI widget 225 identified by the content validity service 221 and include markup language generated by the alternative UI widget 225 in the page slot 235 assigned to the expired UI widget 225.

In another embodiment, the content page application 218 can identify an alternative UI widget 225 by selecting the next highest ranked UI widget 225 according to a ranking based upon the performance data 245 and scheduling data 243. In yet another example, the content page application 218 can select an alternative UI widget 225 based upon a calculated relevance metric of other UI widgets 225. In this way, even though an expired UI widget 225 may be suppressed from inclusion in a content page, it is replaced with content that is relevant in some way. The relevance metric can be calculated based upon a textual analysis of metadata associated with the UI widgets 225 or based upon a textual analysis of markup language generated by the UI widgets 225.

Accordingly, embodiments of the disclosure can also improve the efficiency of users tasked with scheduling content for placement within a page slot in a page template 227 associated with a requested content page. Users selecting UI widgets 225 for placement within content pages associated with a site may previously have been required to manually select an expiration date associated with a UI widget 225 or manually remove a UI widget 225 from scheduled content for a site. The content page application 218 can instead automatically detect when a UI widget 225 generates markup language that references expired content. This automatic selection can improve the efficiency of the process of scheduling content for the site so that a user need not manually enter an expiration date associated with UI widgets 225 scheduled for placement within content pages.

Additionally, including expired content within a content page may also result in users exiting a site or seeking alternative sites to view content or purchase items. Therefore, embodiments of the disclosure can prevent scheduling of content that is expired or close to expiration, which can improve user engagement and prevent users from exiting the site. Additionally, in some scenarios, an operator of a site may honor expired promotional content that erroneously appears in a content page for customer satisfaction purposes. This may result in a substantial cost to the operator of the site. Therefore, embodiments of the disclosure can help reduce or eliminate such costs.

Figure 3:
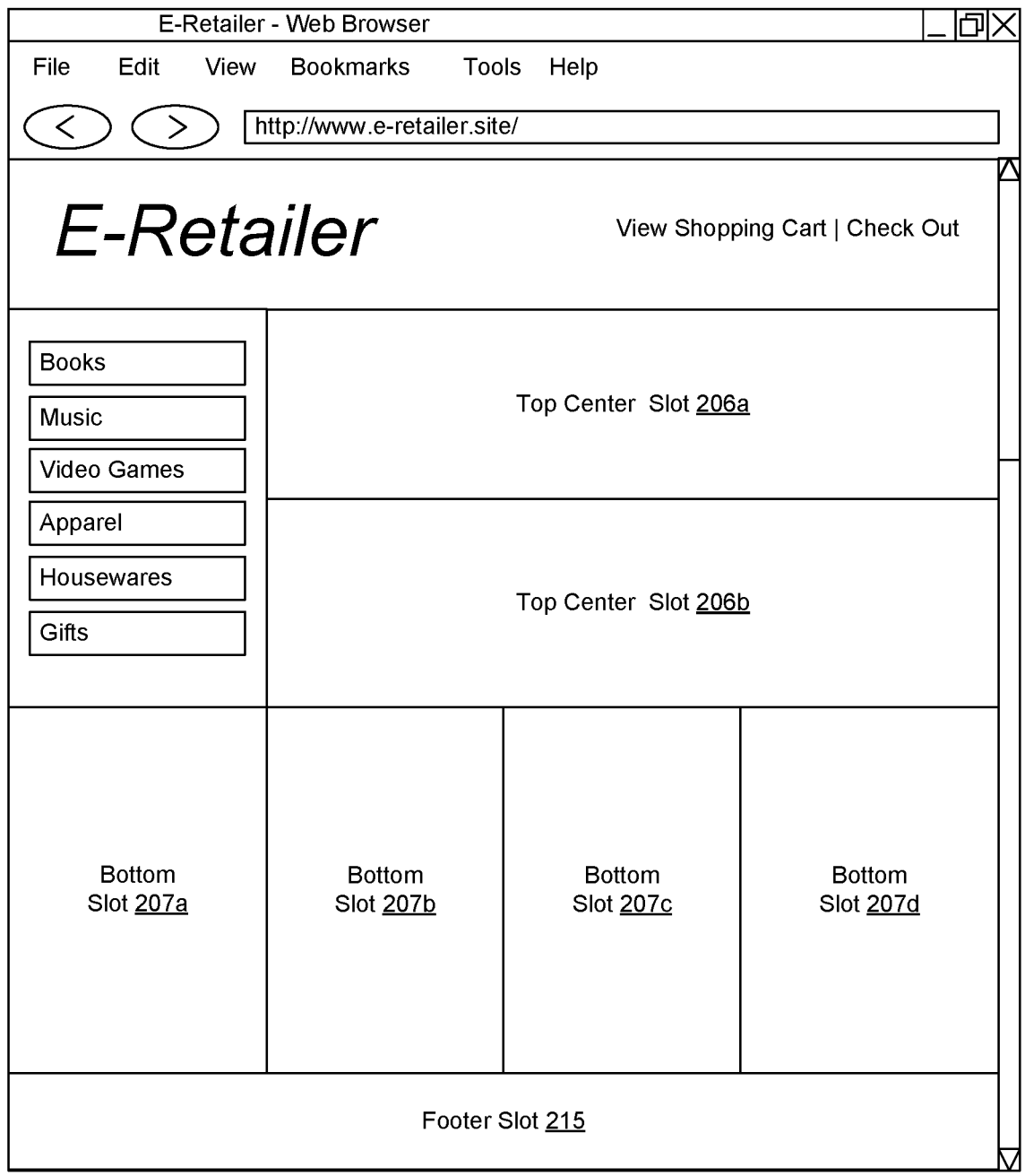
FIG. 3 is a drawing of an example page template according to one embodiment of the disclosure.

Referring next to FIG. 3, shown is one example of a representation of a page template 227 according to an embodiment of the disclosure. The illustrative example of FIG. 3 shows the various page slots 335 that can be defined by a page template 227 corresponding to a content page. As shown in FIG. 2, slots 306a, 306b, and 306c are positioned in a center portion of the page template 227 and may be associated with a respective placement values from highest to lowest in that order. Slots 307a, 307b, 307c, and 307d may be associated with lower placement values than slots 307a, 307b, and 307c and are ranked from highest to lowest from left to right as they appear in the page template 227. A footer slot 315 may be associated with the lowest placement value relative to the other page slots within the page template 227.

Accordingly, when a request to generate the content page is received by the content page application 218, the content page application 218 can consider the various UI widgets 225 for placement within any of the page slots of the page template 227. As noted above, in some embodiments, the content page application 218 can generate an event that informs the various UI widgets 225 of the incoming request, which can in turn submit requests to schedule content within the content page that is generated by the content page application 218. The content page application 218 can also consult scheduling data 243 associated with the various UI widgets 225 in the data store 212 to determine whether a particular UI widgets 225 has been scheduled for placement in the content page. The content page application 218 can generate a ranking according to the scheduling data 243 and performance data 245 associated with the UI widgets 225 considered to schedule content in the content page.

Upon generating a ranked list of UI widgets 225 considered for placement within the content page, the content page application 218 request markup language from a highest ranked subset of the UI widgets 225 for which there are page slots 235 in the page template 227. For each of the UI widgets 225, the content page application 218 then determine whether a content identifier 241 is embedded within the markup language. The content identifier 141 can include a promotional identifier that is embedded within a URL included in markup language generated by the UI widget 225. The content page application 218 can perform a textual search of the markup language and determine whether any text in the markup language matches a content identifier 241 associated with the UI widget 225.

If the content page application 218 identifies a content identifier 241, then the content page application 218 can determine whether the content identifier 241 corresponds to expired content. In one embodiment, the content page application 218 can submit an API call to the content validity service 221 that includes the content identifier 241. The content validity service 221 can determine from the validity data 247 whether the content corresponds to expired content. For example, expired content can correspond to a promotion or coupon code that has expired. Expired content can also correspond to time sensitive information that has become stale or out of date, such as news content, stock quotes, or other informational content.

If the content validity service 221 determines that the content associated with the content identifier 241, such as a landing page to which the URL links or a promotional of coupon code corresponding to the content identifier 241, the content validity service 221 can report the indication that the UI widget 225 corresponds to expired content to the content page application 218 can either suppress or replace the UI widget 225 in the ranked list of UI widgets 225 as described above. In the event that an alternative UI widget 225 is selected, the content page application 218 can request markup language from the alternative UI widget 225 and include the markup language in the page slot 237 to which the replaced UI widget 225 was assigned.

If the UI widget 225 generating markup language with a content identifier 241 corresponds to unexpired content, the content page application 218 can generate a content page corresponding to the page template 227, which can be transmitted to the client device 106 by the content server 215.

Figure 4:
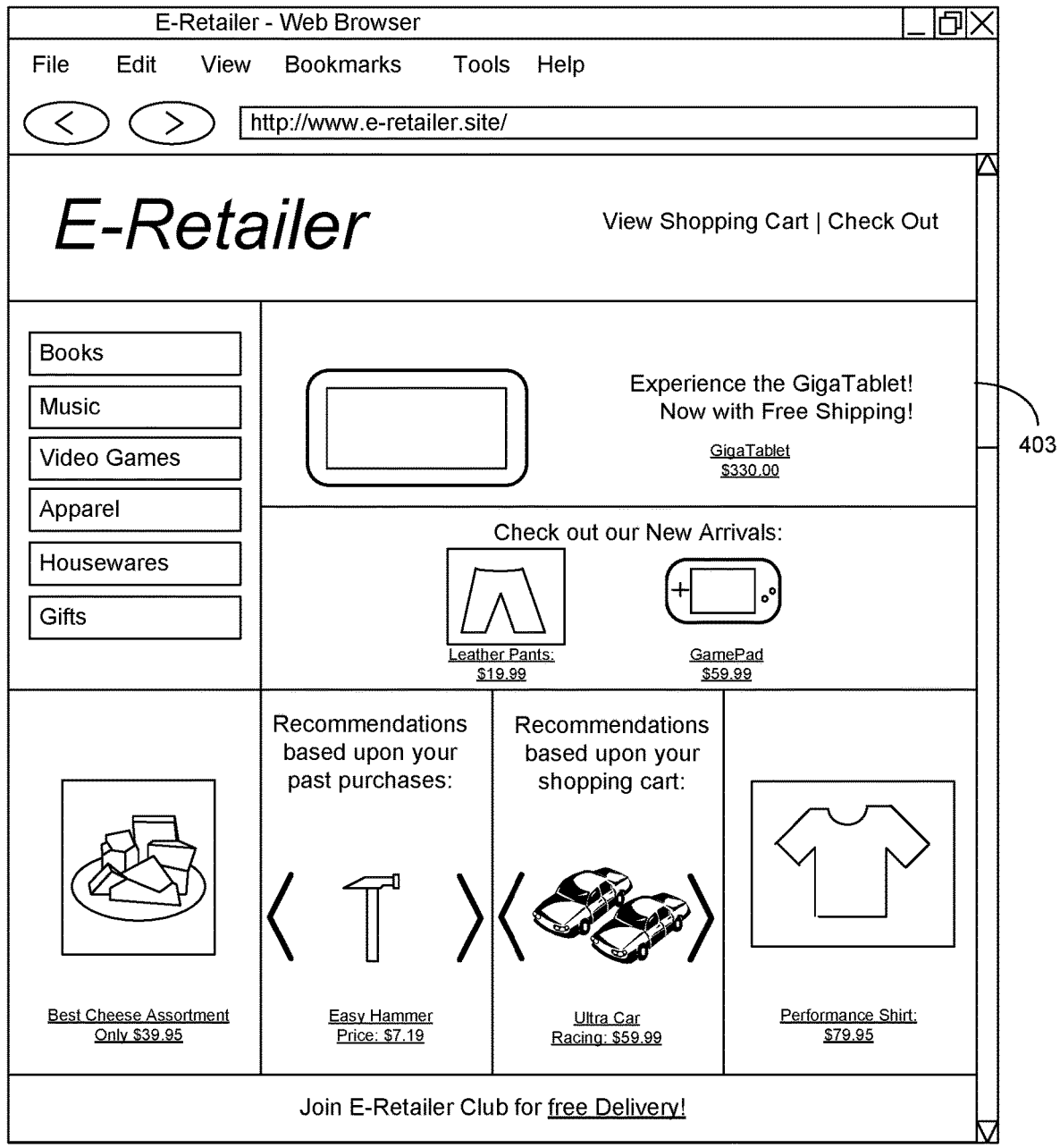
FIG. 4 is a drawing of an example user interface according to one embodiment of the disclosure.

Accordingly, reference is made to FIG. 4, which illustrates an example content page 401 that can be generated by the content page application 218 based upon the page template 227 of FIG. 3. The example of FIG. 4 continues the example presented in FIGS. 1A-1B. In the example of FIG. 4, the content page 401 has markup language in the various page slots 235 associated with the page template 227. The page slot 403 incorporates markup language generated by a UI widget 225 generating content that includes a content identifier 241, such as a promotional identifier corresponding to the content generated by the UI widget 225.

Additionally, the UI widget 225 generating the content in the page slot 403 can also be an alternative UI widget 225 that is selected by the content page application 218 in response to an indication from the content validity service 221 that the UI widget 225 generating the content shown in the page slot 101 of FIG. 1 corresponds to expired content. In this way, the content shown in the page slot of FIG. 1 is suppressed and not shown in the page slot 403 of the content page 401 generated in the example of FIG. 4. The URL embedded within the page slot 403 of the content page 401 can point to a landing page, such as a promotional landing page, for unexpired content, such as an unexpired promotion in an electronic retail site that is related to the initially selected UI widget 225.

Figure 5:
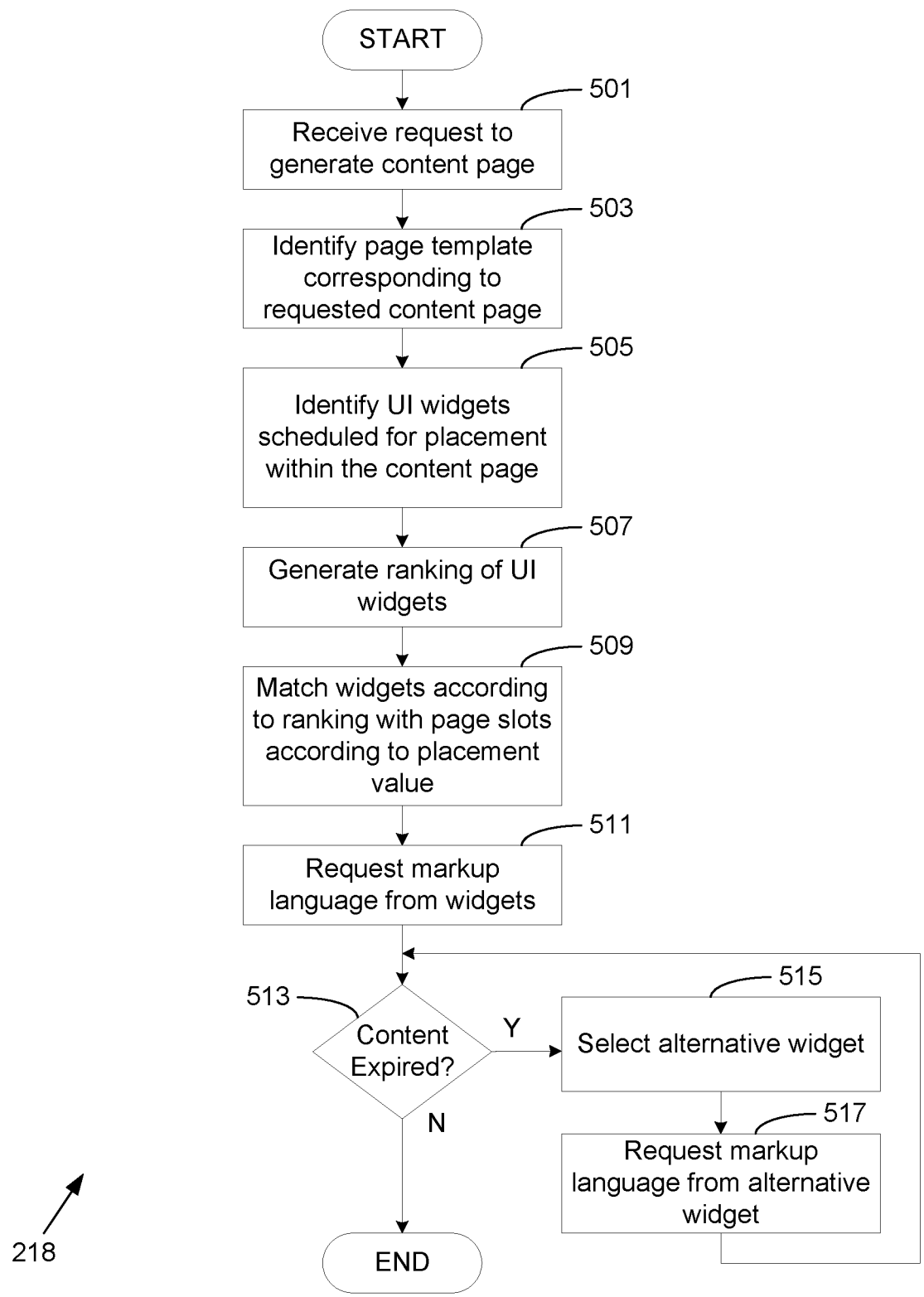
FIGS. 5-6 are flowcharts illustrating examples of functionality implemented as portions of a content page application executed in a computing environment in the networked environment of FIG. 1 according to various embodiments of the present disclosure.

Referring next to FIG. 5, shown is a flowchart that provides one example of the operation of a portion of the content page application 218 according to various embodiments. It is understood that the flowchart of FIG. 5 provides merely an example of the many different types of functional arrangements that may be employed to implement the operation of the portion of the content page application 218 as described herein. As an alternative, the flowchart of FIG. 5 may be viewed as depicting an example of steps of a method implemented in the computing environment 203 (FIG. 1) according to one or more embodiments.

Beginning with box 501, the content page application 218 can obtain a request to generate a content page that is, for example, requested via browser 261 executed by a client device 206. In box 503, the content page application 218 identifies a page template 227 corresponding to the requested content page. At box 505, the content page application 218 can identify UI widgets 225 that are either requesting placement or scheduled for placement within the content page requested on behalf of the user or client device 206. At box 507, the content page application 218 can generate a ranking of the UI widgets 225 that are scheduled for placement or requesting placement within the content page.

At box 509, the content page application 218 can match the ranked UI widgets 225 with page slots 235 of the page template 227 according to the placement value of the page slots 235. The content page application 218 can also select the highest ranked subset of the UI widgets 225 for placement within the page slots 235 of the page template 227. At box 511, the content page application 218 can request markup language from the UI widgets 225 that are selected for placement within the content page. At box 513, the content page application 218 can determine whether the markup language generated for the respective UI widgets 225 corresponds to expired content. One way in which the content page application 218 can detect whether the markup language corresponds to expired content is discussed with respect to FIG. 6.

If any of the markup language corresponds to expired content, the process proceeds to box 515, where the content page application can select an alternative UI widget 225. At box 517, the content page application 218 can request markup language from the alternative UI widget 225. The process can then return to box 513, where the content page application 218 determines whether the markup language generated by the alternative UI widget 225 corresponds to expired content. If the markup language generated by the UI widget 225 corresponds to unexpired content at box 513, the process can proceed to completion or the content page application 218 can generate a content page that the content server 215 can serve to a client device 206.

Figure 6:
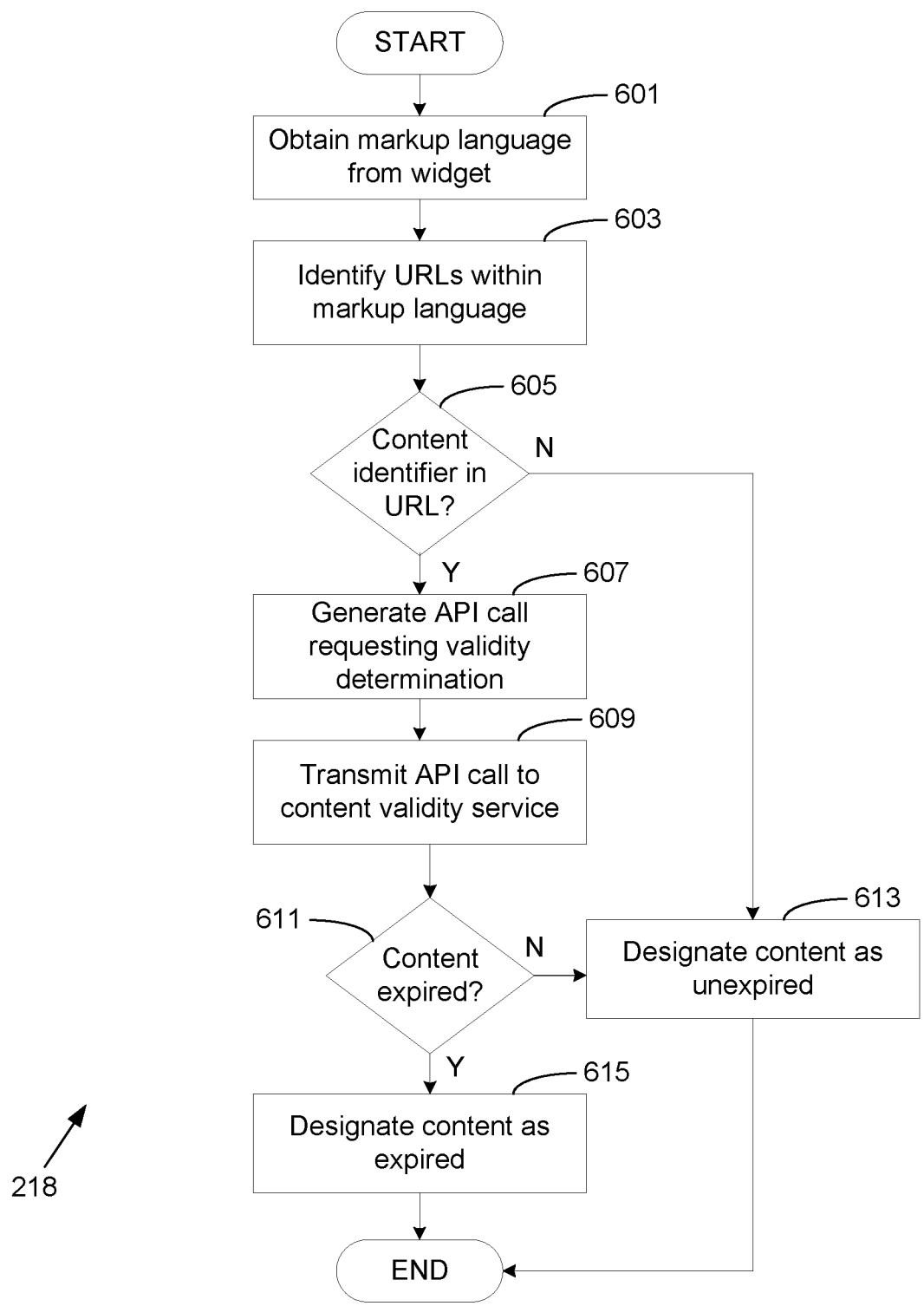

Referring next to FIG. 6, shown is a flowchart that provides one example of the operation of a portion of the content page application 218 according to various embodiments. It is understood that the flowchart of FIG. 6 provides merely an example of the many different types of functional arrangements that may be employed to implement the operation of the portion of the content page application 218 as described herein. As an alternative, the flowchart of FIG. 6 may be viewed as depicting an example of steps of a method implemented in the computing environment 203 (FIG. 1) according to one or more embodiments.

FIG. 6 illustrates an example of how the content page application 218 can determine whether markup language generated by a particular UI widget 225 corresponds to expired content. First, at box 601, the content page application 218 obtains markup language from a UI widget 225. At box 603, the content page application 218 can identify one or more URLs that are contained within the markup language. At box 605, the content page application 218 can determine whether one or more of the URLs contained within the markup language contain a content identifier 241 that corresponds to a UI widget 225. If no content identifiers 241 are contained within the URLs in the markup language, the process can proceed to box 613, where the content page application 218 designates the content generated by the UI widget 225 as unexpired.

If one or more content identifiers 241 are detected in the markup language, then at box 607, the content page application 218 can generate an API call for the content validity service 221 requesting a determination of whether the content identifier 241 corresponds to expired content. If, at box 611, the content validity service 221 returns a response that indicates that the content corresponds to expired content, the content page application 218 can designate the content as expired at box 615. If the content validity service 221 returns a response indicating that the content is unexpired, the content page application can designate the content as unexpired at box 613. Thereafter, the process proceeds to completion.

Figure 7:
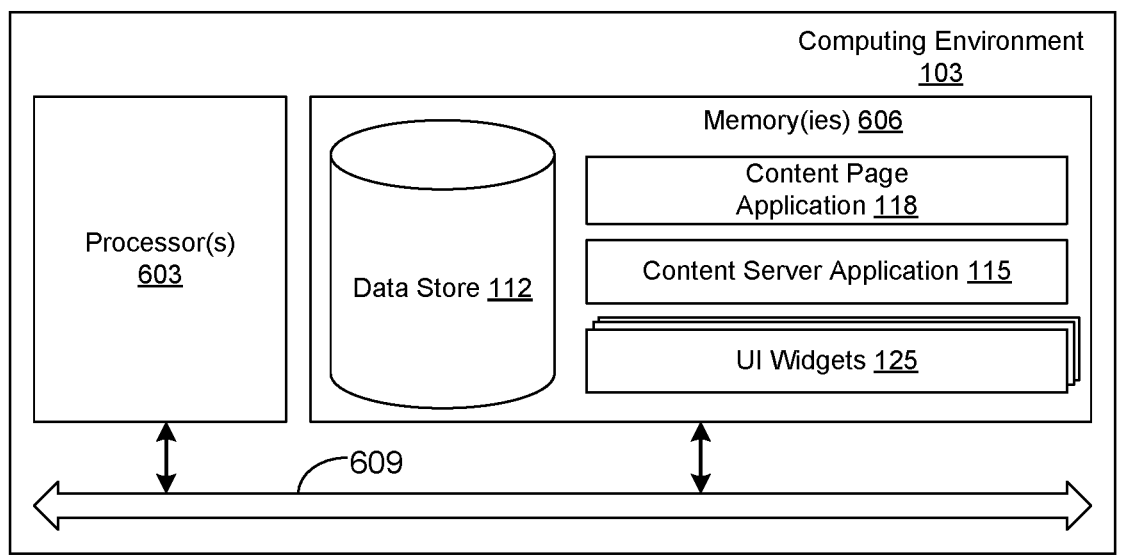
FIG. 7 is a schematic block diagram that provides one example illustration of a computing environment employed in the networked environment of FIG. 1 according to various embodiments of the present disclosure.

With reference to FIG. 7, shown is a schematic block diagram of the computing environment 203 according to an embodiment of the present disclosure. The computing environment 203 includes one or more appropriate computing device 700. The appropriate computing device 700 includes at least one processor circuit, for example, having a processor 703 and a memory 706, both of which are coupled to a local interface 709. To this end, the appropriate computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 is the content page application 218 and potentially other applications. Also stored in the memory 706 may be a data store 212 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Delphi®, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAIVI) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the content page application 218, the content server 215, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 5-6 show the functionality and operation of an implementation of portions of the content page application 218. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 5-6 show a specific order of execution, it is understood that the order of execution may differ from that which is depicted. For example, the order of execution of two or more blocks may be scrambled relative to the order shown. Also, two or more blocks shown in succession in FIGS. 5-6 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the content page application 218, and the content server 215, that comprises software or code can be embodied in any computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
   obtaining a request to generate a content page on behalf of a client device;
   obtaining markup language from a plurality of user interface widgets scheduled for placement in the content page;
   identifying a content identifier associated with markup language of one of the plurality of user interface widgets;
   determining whether the content identifier corresponds to valid content or expired content;
   suppressing rendering of the one of the plurality of user interface widgets in response to a determination that the content identifier corresponds to expired content; and
   generating the content page with markup language generated by one of a plurality of user interface widgets corresponding to a ranked list of user interface widgets.

2. The method of claim 1, wherein determining whether the content identifier corresponds to valid content or expired content comprises obtaining a response to an application programming interface (API) request transmitted to a content validity service, the API request comprising a request to determine whether the content identifier corresponds to valid content or expired content.

3. The method of claim 1, wherein the one of the plurality of user interface widgets corresponds to a highest ranked widget in the ranked list of user interface widgets.

4. The method of claim 1, wherein the content identifier comprises a portion of a uniform resource locator (URL) associated with the markup language of the one of the plurality of user interface widgets.

5. The method of claim 4, wherein the portion of the URL is analyzed to determine that it corresponds to a promotion associated with an item in a product catalog associated with an electronic retail site, wherein the promotion has expired.

6. A system, comprising:
   at least one computing device; and
   a content page application executable in the at least one computing device, the content page application, when executed, configured to cause the at least one computing device to at least:
      obtain a request to generate a content page;
      obtain markup language from a plurality of user interface widgets;
      identify a content identifier associated with markup language of at least one of the plurality of user interface widgets;
      determine whether the content identifier is associated with expired content; and
      remove the at least one of the plurality of user interface widgets from a subset of a ranked list of the plurality of user interface widgets in response to a determination that the content identifier is associated with expired content.

7. The system of claim 6, wherein the content identifier comprises a portion of a uniform resource locator (URL) associated with the markup language of the one of the plurality of user interface widgets.

8. The system of claim 6, wherein the content identifier is embedded within a uniform resource locator (URL) associated with the markup language of the one of the plurality of user interface widgets.

9. The system of claim 8, wherein the URL links to a promotional landing page associated with a promotional campaign that is expired.

10. The system of claim 6, wherein the content page application is further configured to cause the at least one computing device to at least:

generate the ranked list of the plurality of user interface widgets;

identify a highest ranked subset of the plurality of user interface widgets; and generate the content page, wherein the content page incorporates at least one of the highest ranked subset of the plurality of user interface widgets.

11. The system of claim 10, wherein the content page application is further configured to:

identify a page pipeline based at least on arrival characteristics of the request to generate the content page; and wherein the ranked list of the plurality of user interface widgets corresponds to the page pipeline.

12. The system of claim 10, wherein the ranked list is based at least on a relevance metric calculated based upon at least one of a textual analysis of metadata associated with the plurality of user interface widgets and a textual analysis of the markup language generated by the plurality of user interface widgets.

13. The system of claim 10, wherein the content page application is further configured to obtain from a content validity service an identity of an alternative user interface widget for the one of the plurality of user interface widgets.

14. The system of claim 10, wherein the content page application is further configured to cause the at least one computing device to at least match the subset of the ranked list of the plurality of user interface widgets with a plurality of page slots on the content page.

15. A non-transitory computer-readable medium embodying a program executable in at least one computing device, wherein when executed the program causes the at least one computing device to at least:

obtain a request to generate a content page on behalf of a client device;

obtain markup language from a plurality of user interface widgets;

identify a content identifier associated with markup language of one of the plurality of user interface widgets;

determine whether the content identifier is associated with expired content; and suppress rendering of the one of the plurality of user interface widgets in response to a determination that the content identifier is associated with expired content.

16. The non-transitory computer-readable medium of claim 15, wherein the content identifier comprises a portion of a uniform resource locator (URL) associated with the markup language of the one of the plurality of user interface widgets.

17. The non-transitory computer-readable medium of claim 15, wherein when executed the program further causes the at least one computing device to at least:

identify a page template corresponding to the content page, the page template defining a plurality of content slots;

match at least a subset of the plurality of user interface widgets with the plurality of content slots; and generate the content page with the at least a subset of the plurality of user interface widgets.

18. The non-transitory computer-readable medium of claim 15, wherein identifying at least one of the plurality of user interface widgets as corresponding to expired content further comprises determining whether a content identifier corresponding to the at least one of the plurality of user interface widgets is designated as expired.

19. The non-transitory computer-readable medium of claim 15, further comprising designating the at least one of the plurality of user interface widgets as expired by determining that a current time is within a threshold amount of an expiration date associated with content corresponding to the content identifier or that the expiration date has passed.

20. The non-transitory computer-readable medium of claim 15, further comprising designating the at least one of the plurality of user interface widgets as expired by determining that a number of hits is within a threshold amount of a designated number of hits for a campaign.

* * * * *